(12) United States Patent
Siomina et al.

(10) Patent No.: US 8,489,029 B2
(45) Date of Patent: Jul. 16, 2013

(54) REFERENCE SIGNAL INTERFERENCE MANAGEMENT IN HETEROGENEOUS NETWORK DEPLOYMENTS

(75) Inventors: Iana Siomina, Solna (SE); Lars Lindbom, Karlstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 272 days.

(21) Appl. No.: 12/976,225

(22) Filed: Dec. 22, 2010

(65) Prior Publication Data
US 2011/0319025 A1   Dec. 29, 2011

Related U.S. Application Data

(63) Continuation of application No. PCT/SE2010/051432, filed on Dec. 20, 2010.

(60) Provisional application No. 61/357,884, filed on Jun. 23, 2010.

(51) Int. Cl.
*H04B 1/00* (2006.01)

(52) U.S. Cl.
USPC .... 455/63.1; 455/114.2; 455/296; 455/575.7; 375/144

(58) Field of Classification Search
USPC ............. 455/63.1, 114.2, 296, 114.3, 575.7, 455/278.1, 501, 67.13; 375/144, 148, 346; 370/334
See application file for complete search history.

(56) References Cited

U.S. PATENT DOCUMENTS

| | | | |
|---|---|---|---|
| 6,308,085 B1 | 10/2001 | Shoki | |
| 7,574,179 B2 * | 8/2009 | Barak et al. | 455/101 |
| 8,315,225 B2 * | 11/2012 | Xu et al. | 370/330 |
| 2004/0204105 A1 | 10/2004 | Liang et al. | |
| 2006/0046662 A1 * | 3/2006 | Moulsley et al. | 455/69 |
| 2008/0049672 A1 * | 2/2008 | Barak et al. | 370/330 |
| 2008/0260059 A1 | 10/2008 | Pan | |
| 2008/0268833 A1 * | 10/2008 | Huang et al. | 455/425 |
| 2008/0292012 A1 * | 11/2008 | Kim et al. | 375/260 |
| 2010/0075706 A1 | 3/2010 | Montojo et al. | |
| 2010/0238845 A1 * | 9/2010 | Love et al. | 370/280 |
| 2011/0105144 A1 * | 5/2011 | Siomina et al. | 455/456.1 |

(Continued)

FOREIGN PATENT DOCUMENTS

| | | |
|---|---|---|
| CN | 101174866 A | 5/2008 |
| WO | 2006/125150 A2 | 11/2006 |

(Continued)

OTHER PUBLICATIONS

EPO, Int'l Search Report in PCT/SE2010/051432, Jul. 21, 2011.

(Continued)

*Primary Examiner* — Minh D Dao
(74) *Attorney, Agent, or Firm* — Potomac Patent Group PLLC

(57) ABSTRACT

Methods and apparatus for enabling interference coordination in a communication network. A base station includes a plurality of antenna ports. Each antenna port is configured to transmit a reference signal, and each antenna port is associated with a respective cell. The base station determines a set of cells where transmissions of reference signals is to be performed from a reduced set of the plurality of antenna ports. The base station determines a subset of antenna ports in at least one cell of the determined set of cells to enable interference coordination in the network, and transmits the reference signal from the subset of antenna ports.

33 Claims, 22 Drawing Sheets

U.S. PATENT DOCUMENTS

| | | | |
|---|---|---|---|
| 2011/0274026 A1* | 11/2011 | Huang et al. | 370/312 |
| 2011/0274031 A1* | 11/2011 | Gaal et al. | 370/315 |
| 2012/0040687 A1* | 2/2012 | Siomina et al. | 455/456.1 |
| 2012/0057480 A1* | 3/2012 | Yoo et al. | 370/252 |
| 2012/0087261 A1* | 4/2012 | Yoo et al. | 370/252 |
| 2012/0106374 A1* | 5/2012 | Gaal et al. | 370/252 |
| 2012/0113844 A1* | 5/2012 | Krishnamurthy | 370/252 |
| 2012/0115469 A1* | 5/2012 | Chen et al. | 455/434 |
| 2012/0176982 A1* | 7/2012 | Zirwas et al. | 370/329 |
| 2012/0207105 A1* | 8/2012 | Geirhofer et al. | 370/329 |
| 2012/0294228 A1* | 11/2012 | Song et al. | 370/315 |
| 2012/0322447 A1* | 12/2012 | Ramachandran et al. | 455/436 |
| 2012/0329400 A1* | 12/2012 | Seo et al. | 455/63.1 |
| 2013/0028199 A1* | 1/2013 | Song et al. | 370/329 |
| 2013/0039268 A1* | 2/2013 | Blankenship et al. | 370/328 |
| 2013/0040683 A1* | 2/2013 | Siomina et al. | 455/517 |
| 2013/0045770 A1* | 2/2013 | Aschan et al. | 455/522 |

FOREIGN PATENT DOCUMENTS

| | | |
|---|---|---|
| WO | 2007/051190 A1 | 5/2007 |
| WO | 2008/011898 A1 | 1/2008 |
| WO | 2009/131162 A1 | 10/2009 |
| WO | 2010/064842 A2 | 6/2010 |

OTHER PUBLICATIONS

EPO, Written Opinion in PCT/SE2010/051432, Jul. 21, 2011.

* cited by examiner

REFERENCE SIGNAL INTERFERENCE MANAGEMENT IN HETEROGENEOUS NETWORK DEPLOYMENTS

TECHNICAL FIELD

The embodiments herein relate in general to signal measurements in wireless communications networks and in particular to managing and coordinating the interference from reference signals in heterogeneous network deployments.

BACKGROUND

In a typical cellular system, also referred to as a wireless communications network, wireless terminals, also known as mobile stations and/or User Equipment units (UEs) communicate via Radio Access Networks (RAN) to a Core Network (CN). The wireless terminals may be mobile stations or user equipments such as mobile telephones also known as cellular telephones, and laptops with wireless capability, e.g., mobile termination, and thus may be, for example, pocket, hand-held, computer-included, or car-mounted mobile devices which communicate voice and/or data with radio access network. The radio access network covers a geographical area which is divided into cell areas, with each cell area being served by a radio network node, such as a base station, which in some radio access networks is also called eNodeB (eNB), NodeB, or base station. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations. There are different types of radio network nodes/base stations, such as for example macro node/base station, pico node/base station, home eNodeB or femto base station. Typically, the types of base stations are associated with different power classes, e.g. a typical maximum transmit power of macro base station (aka wide-area base station) is above 40 dBm, whilst lower-power base stations such as pico of femto typically have the output power below 30 dBm.

The interest in deploying low-power nodes, such as pico base stations, home eNodeBs (HeNB, HBS), relays, remote radio heads, etc., for enhancing macro network performance in terms of the network coverage, capacity, and service experience of individual users has been constantly increasing over the last few years. At the same time, it has been realized the need for enhanced interference management techniques to address the interference issues caused, for example, by a significant transmit power variation among different cells and cell association techniques developed earlier for more uniform networks.

In 3$^{rd}$ Generation Partnership Project (3GPP), heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e., small geographical areas with higher user density and/or higher traffic intensity where installation of pico nodes can be considered to enhance performance. Heterogeneous deployments may also be viewed as a way of densifying networks to adopt for the traffic needs and the environment. However, heterogeneous deployments bring also challenges for which the network has to be prepared for to ensure efficient network operation and superior user experience.

In heterogeneous networks, a mixture of cells of differently sized and overlapping coverage areas are deployed. A cell is a geographical area where radio coverage is provided by a base station. More than one cell can be associated with one base station. One example of such cell deployment may be a network comprising pico cells deployed within the coverage area of a macro cell. The pico cells and macro cell may each comprise a base station. A base station may be e.g. a pico base station, a macro base station, Home Base Station (HBS), radio base station, evolved node B (eNB), base station, relay, remote radio heads etc.

A base station comprises at least one antenna port, e.g. antenna port 0. Each antenna port is configured to transmit and receive signals from the base station to e.g. one or more user equipment.

Other examples of low-power nodes in heterogeneous networks are home base stations (HBS) and relays. As discussed below, the large difference in transmitted output power, e.g., 46 dBm in macro cells and less than 30 dBm in pico cells, results in an interference situation different from that seen in networks where all base stations have the same output power.

A Long Term Evolution (LTE) system uses Orthogonal Frequency Division Multiplex (OFDM) as an OFDM Access technique (OFDMA) in the downlink from system nodes to user equipments (UEs) 505, and Discrete Fourier Transform (DFT)-spread OFDM in the uplink from a user equipment 505 to an eNB. LTE channels are described in 3GPP Technical Specification (TS) 36.211 V9.1.0, Physical Channels and Modulation is described in Release 9 of LTE, among other specifications. An LTE system is used as an example in this document. However other network standards, such as GPRS, WiMAX, UMTS etc. are also applicable.

In the time domain, LTE downlink transmissions are organized into radio frames of 10 milliseconds (ms) duration, each radio frame 101 comprises ten equally-sized subframes 103 of 1 ms duration as illustrated in FIG. 1. A subframe 103 is divided into two slots, each of 0.5 ms duration. Time domain is a term used to describe the analysis of physical signals, with respect to time.

The resource allocation in LTE is described in terms of resource blocks, where a resource block corresponds to one slot in the time domain and 12 contiguous 15 kHz subcarriers in the frequency domain. Two consecutive, i.e. in time, resource blocks represent a resource block pair and correspond to the time interval upon which scheduling operates.

Reference Signals

The use of multiple antennas plays an important role in modern wireless communication systems, such as 3$^{rd}$ Generation (3G) LTE systems, to achieve improved system performance, including capacity and coverage, and service provisioning. Acquisition of channel state information (CSI) at the transmitter or the receiver is important to proper implementation of multi-antenna techniques. In general, channel characteristics, such as the impulse response, are estimated by sending and receiving one or more predefined training sequences, which can also be called Reference Signals (RS). To estimate the channel characteristics of a DL for example, a base station 503 transmits reference signals to user equipments 505, which use the received versions of the known reference signals to estimate the DL channel, e.g. to provide an estimated channel matrix. The user equipments can then use the estimated channel matrix for coherent demodulation of the received DL signal, and obtain potential beam-forming gain, spatial diversity gain, and spatial multiplexing gain available with multiple antennas. In addition, the reference signals may be used to do channel quality measurement to support link adaptation.

Beam-forming is a signal processing technique used to control the directionality of the reception or transmission of a signal. Spatial diversity refers to using two or more antennas to improve the quality and reliability of a wireless link. Using multiple antennas offers a receiver several observations of the same signal. Spatial Multiplexing Gain is obtained when a system is transmitting different streams of data from the same radio resource in separate spatial dimensions. Data is hence sent and received over multiple channels—linked to different pilot frequencies, over multiple antennas.

Transmissions in a network using OFDM may be seen as a grid in time and frequency. The scheduler in the base station may allocate a specific number of subcarriers during a specific time to one user equipment. To simplify the system, too small units cannot be allocated to one user equipment, and the smallest unit within OFDM is referred to as a resource element, and that is one OFDM symbol transferred on one carrier. In the case of OFDM transmission a straightforward design of a reference signal is to transmit known reference symbols in an OFDM frequency-vs.-time grid. Cell-specific Reference Signals (CRS) and symbols are described in Clauses 6.10 and 6.11 of 3GPP TS 36.211. Up to four cell-specific reference signals corresponding to up to four transmit antennas of an eNodeB are specified. There is one reference signal transmitted per downlink antenna port. Among the aforementioned reference signals, only CRS have to be transmitted in every downlink subframe, and the other RS are transmitted at specific occasions configured by the network.

LTE uses four types of downlink reference signals (RS):
Cell-specific reference signals, associated with non Multimedia Broadcast/Multicast Service Single Frequency Network (MBSFN) transmission.
MBSFN reference signals, associated with MBSFN transmission.
UE-specific reference signals.
Positioning reference signals.

The reference signals are referred to as RS in some of the figures.

Cell-Specific Reference Signals

CRS are transmitted in the downlink from an eNB, or base station, to a user equipment, or terminal, every subframe and over the entire system bandwidth, from antenna ports 0, 1, 2 or 3. In non-MBSFN subframes, cell-specific reference signals (CRS) are transmitted on the resource elements shown in FIGS. 2*a-c*, for the case of a normal cyclic prefix. In telecommunications, the term cyclic prefix refers to the prefixing of a symbol with a repetition of the end. In subframes used for MBSFN transmissions, only the first two symbols may be used for CRS. FIGS. 2*a-c* illustrates a resource grid of subcarriers and available OFDM symbols for antenna ports. Each element in the resource grid is called a resource element. Each resource element is used to transmit a reference signal on one antenna port.

FIG. 2*a* illustrates CRS transmission from one antenna port, FIG. 2*b* illustrates CRS transmission from two antenna ports and FIG. 2*c* illustrates CRS transmission from four antenna ports. The x-axis of the FIGS. 2*a-c* are time slots In FIGS. 2*a-c*, the notation Rp is used to denote a resource element used for reference signal transmission on antenna port p. The hatched resource elements without any text indicate resource elements which are not used for transmission on the antenna port of interest. The hatched resource elements with text, Rp, indicate reference symbols transmitted on the antenna port of interest. For example, in FIG. 2*b*, reference signals R1 is located in the first OFDM symbol (1$^{st}$ RS) and 3$^{rd}$ to the last OFDM symbol (2$^{nd}$ RS).

Different cells can use 6 different shifts in frequency, and 504 different signals exist. The frequency shifts are cell-specific and depend on Physical layer Cell Identity (PCI). The relation between the PCI and the CRS frequency shift is given by $V_{shift}=N_{ID}^{cell}$ mod 6, i.e., formally up to six-reuse may be configured for CRS. In practice, however, the effective reuse depends on the number of transmitting antenna ports. As may be seen from FIG. 3, CRS have a reuse-six pattern for CRS transmitted from 1 antenna port and reuse-three for 2 to 4 antenna ports.

CRS measurements are used at least for control channel demodulation, mobility measurements, e.g. Reference Signal Received Power (RSRP) and Reference Signal Received Quality (RSRQ), and channel estimation. When measuring RSRP and RSRQ, the user equipment 505 measures over a measured bandwidth, which can be smaller than the system bandwidth, which may be decided by the user equipment. The number of antenna ports used for CRS transmissions is configured by the network and is communicated to user equipments as a part of the system information broadcasted in the cell, but the user equipments expect CRS to be transmitted at least from one antenna port, e.g. port 0.

One advantage of transmitting the CRS from multiple antenna ports is a higher processing gain and thus more accurate measurement and potentially a shorter measurement time. The measurement refers to measurements performed on CRS, e.g. Radio Resource Management (RRM) measurements, positioning measurements etc. Furthermore, CRS from multiple antenna ports is needed for channel estimation for multi-antenna transmissions where different data streams are transmitted on different antenna ports. In the latter case, the CRS transmitted on each multiple-antenna port needs to be different, i.e. antenna port specific CRS.

Downlink Control Channels in LTE

Transmissions in LTE are dynamically scheduled in each subframe where the base station transmits assignments and/or grants to certain user equipments via a Physical Downlink Control Channel (PDCCH), which is transmitted in the first OFDM symbol(s) in each subframe and spans over the whole system bandwidth. A user equipment that has decoded downlink control information, carried by a PDCCH, knows which resource elements in the subframe that contain data aimed for the user equipment.

Demodulation of received data requires estimation of the radio channel, which is done by using transmitted reference symbols, i.e., symbols known by the receiver. For example, in LTE, cell-specific reference symbols are transmitted in all downlink subframes and, in addition to assist downlink channel estimation, they are also used for mobility measurements performed by the user equipments. LTE supports also UE-specific reference symbols aimed only for assisting channel estimation.

FIG. 3 illustrates an exemplary mapping of physical control and data channels and cell specific reference signals on resource elements in a downlink subframe. In this example, the PDCCHs occupy the first 301 out of three possible OFDM symbols, and so in this particular case, the mapping of data may start already at the second 303 OFDM symbol.

The length of the control region, which may vary subframe to subframe, is conveyed in the Physical Control Format Indicator Channel (PCFICH), which is transmitted within the control region, at locations known by user equipments. After a user equipment has decoded the PCFICH, it knows the size of the control region and in which OFDM symbol the data transmission starts. Also transmitted in the control region is the Physical Hybrid-Admission Request (HARQ) Indicator Channel, which carries Acknowledgement/Non Acknowledgement (ACK/NACK) responses to a user equipment to inform if the uplink data transmission in a previous subframe was successfully decoded by the base station or not.

Interference Management for RS

To ensure reliable and high-bitrate transmissions, maintaining a good signal quality is required in wireless networks. The signal quality is determined by the received signal strength and its relation to the total interference and noise received by the receiver. A good network plan, which among other things includes cell planning, is a prerequisite for successful network operation, but it is static. For more efficient radio resource utilization, it has to be complemented at least by semi-static and dynamic radio resource management mechanisms, which are also intended to facilitate interference management, and deploying more advanced antenna technologies and algorithms.

One way to handle interference is, for example, to adopt more advanced transceiver technologies, e.g., by implementation of interference cancellation mechanisms in terminals. Another way, which may be complementary to the former, is to design efficient interference coordination algorithms and transmission schemes in the network.

Inter-cell interference coordination (ICIC) methods for coordinating data transmissions between cells have been specified in LTE Release 8, where the exchange of ICIC information between cells in LTE is carried out via an X2 interface according to a specified X2-AP protocol. The X2 interface is the interface between to neighboring base stations. Based on this information, the network can dynamically coordinate data transmissions in different cells in the time-frequency domain and also by power control so that the negative impact of inter-cell interference is minimized.

In the current 3GPP specifications, ICIC possibilities for control channels are more limited. One approach of handling the interference on control channels is illustrated in FIG. 4, where an interfering cell, e.g., a macro cell, does not transmit PDCCHs, and thus no data, in some subframes 401, although other control channels may still be transmitted. The other cells, e.g., pico cells, are aware of the locations of these low interference subframes 401 in time and can prioritize scheduling in those subframes the user equipments which otherwise potentially may strongly suffer from the interference caused by the interfering cell. From the legacy terminal point of view, CRS still need to be transmitted in all subframes, so there will be inter-cell interference from CRS. In FIG. 4, a thin box illustrates the control region, and the broad box illustrates the data region. A sub frame 401 comprises one control region and one data region.

Given more flexibility, many techniques exist for managing interference to and from data channels, e.g., various time-division and frequency-division multiplexing schemes. The possibilities to efficiently mitigate inter-cell interference to and from control channels are limited with the current standard. Some examples are interleaving, time shifting, and blanking. Even less flexibility exists for dealing with interference to and from physical signals which typically have a pre-defined static resource allocation in the time-frequency space. An example of a physical signal is a reference signal.

Some techniques for mitigating inter-cell interference known from the prior-art are:

Signal cancellation, by which the channel is measured and used to restore the signal from, a limited number of, the strongest interferers. Impact on the receiver implementation and its complexity; in practice channel estimation puts a limit on how much of the signal energy that can be subtracted.

Symbol-level time shifting. No impact on the standard, but not relevant for Time Division Duplex (TDD) networks and networks providing the MBMS service.

Complete signal muting in a subframe, e.g. not transmitting CRS in some subframes for energy efficiency reasons proposed earlier in 3GPP. Non-backward compatible to Rel.8/9 user equipments which expect CRS to be transmitted at least on antenna port 0.

Given the very limited set of possibilities listed above, there is a strong need for simple but efficient new techniques to resolve the CRS interference issue.

Indication of the Number of Antenna Ports

There exist techniques to allow a terminal to blindly detect the number of antenna ports, but such techniques increase the terminal complexity and since they are in general not required by the standard they may be not implemented in the terminals.

The number of antenna ports may be signaled by the network to the user equipment as a part of the system information, e.g., as a part of the radio resource configuration information, e.g., in the AntennaInfoDedicated or AntennaInfoCommon information elements, that is common for all user equipments and is optionally comprised in the System Information Block Type 2 (SIB2). Transmission of SIB2 is dynamically scheduled by the network and the scheduling information is transmitted to the user equipment as a part of System Information Block Type 1 (SIB1), which is transmitted with a fixed periodicity of 80 ms in a Radio Resource Control (RRC) message via the broadcast channel and repeated within 80 ms. There is a possibility to transmit the most essential system information, e.g. system bandwidth, PHICH configuration or system frame number, more frequently, for which Master Information Block (MIB) is specified which is transmitted with a fixed periodicity of 40 ms over the broadcast channel and repeats within 40 ms, but MIB does not contain the information on antenna ports.

The presence of antenna port 1 can also be indicated by the PresenceAntennaPort1 information element which is a part of an Evolved-Universal Mobile Telecommunications System Terrestrial Radio Access Network (E-UTRAN) measurement object transmitted in an RRCConnectionReconfiguration message. When PresenceAntennaPort1 is set to TRUE, the user equipment may assume that at least two cell-specific antenna ports are used in all neighboring cells.

Since they are always transmitted, CRS are a permanent source of interference to neighbor cells. Furthermore, when more than one antenna port is used for CRS in a cell, the CRS may be transmitted at a power level higher than the reference power level utilizing the free power from the unused CRS resource elements to be transmitted from another antenna port in the same symbol. The data can be transmitted in other symbols than CRS symbols; the control channels have less flexibility and thus the probability of colliding with other-cell CRS is higher. For CRS measurements, the situation is the worst in synchronized networks, where the same symbols, according to the CRS transmission pattern such as exemplified in FIG. 2, are used for CRS transmissions in all cells and these symbols with always-transmitted CRS always collide. In asynchronous network, in general the interference on CRS is more randomized; however, it may also happen that a CRS symbol collides with a symbol where a synchronization signal, e.g., Primary Synchronization Signal (PSS) or Secondary Synchronization Signal (SSS), or a broadcast signal is transmitted, which may degrade the measurement quality of those signals compared to if they were colliding with data symbols in a low loaded network.

Furthermore, although a cyclic prefix is used in LTE in order to make transmissions in neighbor symbols orthogonal, it may be so that the orthogonality is not maintained between the symbols even with carefully designed patterns orthogonal among cells when the delay spread exceed the cyclic prefix, which may happen in large cells or in cells in challenging urban environments. There exist techniques for inter-symbol interference cancellation, but the advanced techniques may significantly increase the user equipment complexity. This means that it is preferable to reduce the number of REs permanently allocated for transmissions, especially when such REs are the sources of high interference.

The interference generated by CRS becomes particularly crucial in heterogeneous network deployments where the transmit power may significantly vary by cell, e.g., a macro cell can be transmitting at 46 dBm and a pico cell can be transmitting at 24 dBm, further increasing the gap between the received interference and the received measured signal power. Thus the necessity of dealing with interference from macro-cell CRS when measuring a signal from a lower-power node has been indicated by many companies in 3GPP.

Since CRS are transmitted across a subframe, they interferer to the control channels, data channels and physical signals, e.g., CRS, as described above. The impact may be of a different significance in each case, but in general managing the CRS interference is important for improving the overall system performance.

The existing signaling is not dynamic and flexible enough to allow for dynamic switching of antenna ports when, for example, low interference subframes or almost blank subframes are configured in the network.

SUMMARY

Embodiments of this invention avoid at least one of the above disadvantages and enjoy improved interference management in communication networks.

According to a first aspect, the objective is achieved by a method in a base station for enabling interference coordination in a communication network. The base station comprises a plurality of antenna ports. Each antenna port is configured to transmit a reference signal. Each antenna port is associated with a respective cell. The base station determines a set of cells where transmissions of reference signals is to be performed from a reduced set of the plurality of antenna ports. The base station determines a subset of antenna ports in at least one cell of the determined set of cells to enable interference coordination in the network. The base station transmits the reference signal from the subset of antenna ports.

According to a second aspect, the objective is achieved by a base station for enabling interference coordination in a communication network. The base station comprises a plurality of antenna ports. Each antenna port is configured to transmit a reference signal. Each antenna port is associated with a respective cell. the base station further comprises a processor configured to determine a set of cells where transmissions of reference signals is to be performed from a reduced set of the plurality of antenna ports. The processor is further configured to determine a subset of antenna ports in at least one cell of the determined set of cells, to enable interference coordination in the communication network. The base station further comprises a transmitter configured to transmit the reference signal from the subset of antenna ports.

According to a third aspect, the objective is achieved by a method in a user equipment. The user equipment determines whether a reference signal is to be received from a subset of antenna ports associated with low interference subframes. The subset of antenna ports being comprised in a base station. The subset of antenna ports is associated with at least one cell. The user equipment receives the reference signal from the subset of antenna ports.

According to a fourth aspect, the objective is achieved by a user equipment in a communication network. The user equipment comprises a processor which is configured to determine whether a reference signal is to be received from a subset of antenna ports associated with low interference subframes. The subset of antenna ports is comprised in a base station. The subset of antenna ports being associated with at least one cell. The processor is further configured to receive the reference signal from a subset of antenna ports.

According to a fifth aspect, the objective is achieved by a method in a user equipment. The user equipment is comprised in a communication network. The method performs assisted user equipment measurement processing. The user equipment is comprised in a cell of a plurality of cells in a communication network. The user equipment acquires information about a set of interfering cells among the plurality of cells. The user equipment identifies a set of time-frequency resources affected by the set of interfering cells, and performs puncturing on the identified time-frequency resources.

According to a sixth aspect, the objective is achieved by a user equipment. The user equipment is associated with a cell of a plurality of cells in a communication network. The user equipment comprises a processor configured to acquire information about a set of interfering cells among the plurality of cells. The processor is further configured to identify a set of time-frequency resources affected by the set of interfering cells, and to perform puncturing on the identified time-frequency resources.

According to a seventh aspect, the objective is achieved by a method in a network node for enabling interference coordination in a communication network. The network node is associated with a cell. The network node comprising information about a set of interfering cells. The network node acquires information about a set of interfering cells among a plurality of cells. The network node transmits the information about the set of interfering cells among a plurality of cells to a user equipment enabling interference coordination in the communication network.

According to an eight aspect, the objective is achieved by a network node for enabling interference coordination in a communication network. The network node is associated with a cell. The network node comprises information about a set of interfering cells. The network node comprises a processor which is configured to acquire information about a set of interfering cells among a plurality of cells. The network node comprises one or more antennas configured to transmit information about the set of interfering cells among a plurality of cells to a user equipment, enabling interference coordination in the communication network. The transmitted information is based on the acquired information.

According to a ninth aspect, the objective is achieved by a method in network node for enabling interference coordination in a communication network. This provides enhanced cell planning adopted for heterogeneous network deployments. The network node comprises a plurality of antenna ports. Each antenna port is configured to transmit a reference signal according to a signal pattern. The network node decides an active set of antenna ports from the plurality of antenna ports based on a reserved subset of signal patterns associated with at least one layer of network nodes. The reserved subset of signal patterns associated with low interference subframes and reserved from a plurality of signal patterns or indications to signal patterns. The network node transmits reference signals from the decided active set of antenna ports according to the reserved subset of signal pattern, enabling interference coordination in the communication network.

According to a tenth aspect, the objective is achieved by a network node for enabling interference coordination in a communication network. The network node comprises a plurality of antenna ports. Each antenna port is configured to transmit a reference signal according to a signal pattern. The network node comprises a processor which is configured to decide an active set of antenna ports from the plurality of antenna ports based on a reserved subset of signal patterns associated with at least one layer of network node. The subset of signal patterns associated with low interference subframes and reserved from a plurality of signal patterns or indications to signal patterns. The network node further comprises a transmitter configured to transmit reference signals from the decided active set of antenna ports according to the reserved subset of signal pattern, enabling interference coordination in the communication network.

The embodiments herein afford many advantages, for which a non-exhaustive list of examples follows:

Reduced CRS interference in the control region, on CRS, and data channels leads to improved system performance and in particular in heterogeneous deployments.

Another advantage is that facilitating user equipment measurements with some of the disclosed methods according to the present solution by introducing the new signalling reduces the user equipment complexity.

Further, the embodiments herein provides the advantage of reducing the over-estimation of the radio channel quality for legacy macro user equipments, which may comprise low-interference subframes in the interference measurements, although they will only be scheduled in subframes with potentially much higher interference.

Enhanced cell planning and interference coordination improves the performance of heterogeneous deployments.

One advantage of transmitting the CRS from multiple antenna ports is a higher processing gain and thus more accurate measurement and potentially a shorter measurement time. Furthermore, CRS from multiple antenna ports is needed for channel estimation for multi-antenna transmissions where different data streams are transmitted on different antenna ports. In the latter case, the CRS transmitted on each multiple-antenna port needs to be different, i.e. antenna port specific CRS.

The embodiments herein are not limited to the features and advantages mentioned above. A person skilled in the art will recognize additional features and advantages upon reading the following detailed description.

BRIEF DESCRIPTION OF THE DRAWINGS

The solution will now be further described in more detail in the following detailed description by reference to the appended drawings illustrating embodiments of the embodiments herein and in which.

The drawings are not necessarily to scale, and emphasis is instead being placed upon illustrating the principles of the solution.

DETAILED DESCRIPTION

The embodiments herein relate to methods and apparatus which are configured for one or more of the following:
  To facilitate control of the set of active antenna ports used for physical signal transmissions in order to reduce the physical signal interference,
  For assisted user equipment measurement processing, and
  For enhanced cell planning adopted for heterogeneous network deployments.

The three parts may be viewed as separate embodiments or may form any combination.

Figure 5:
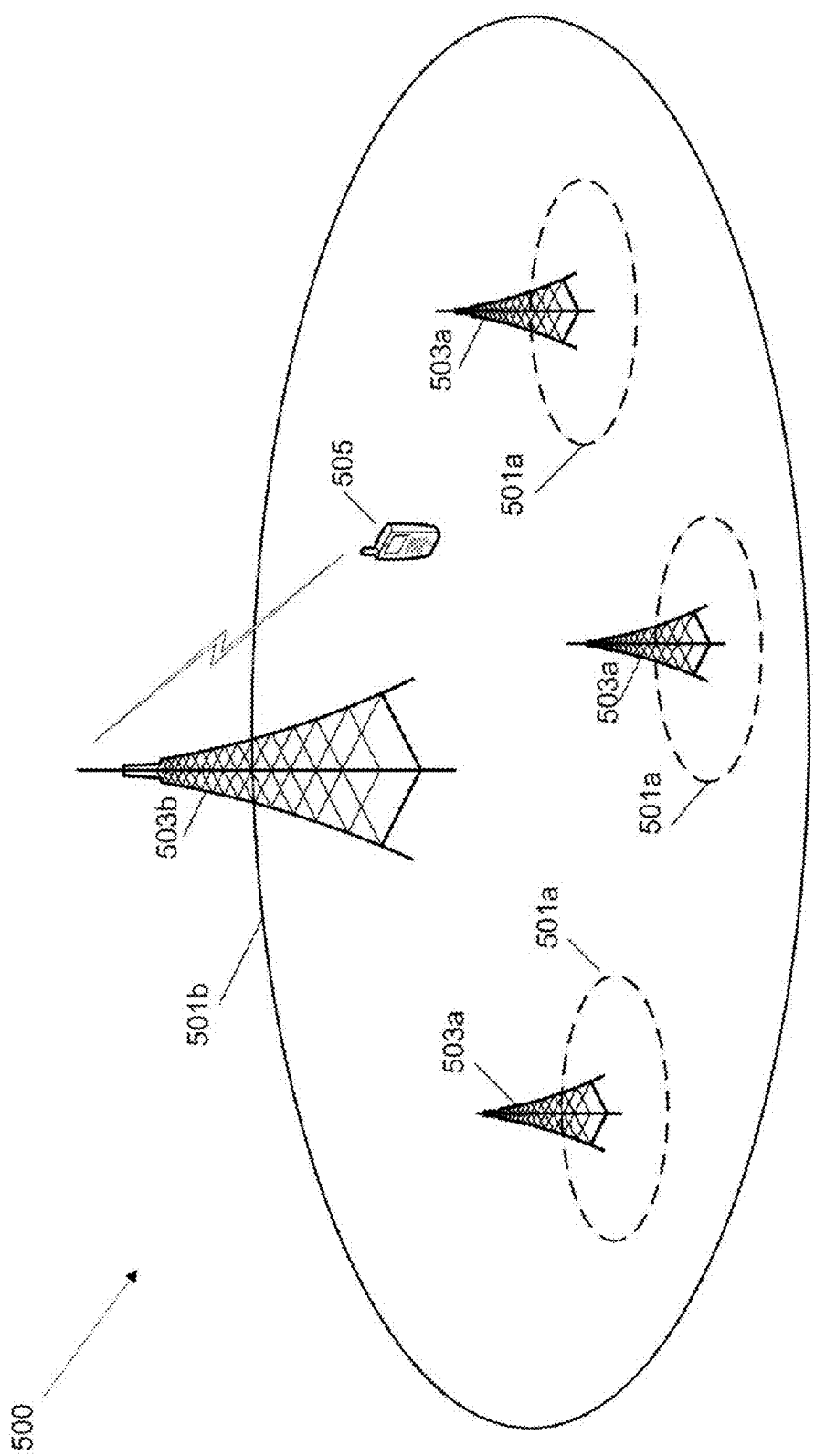
FIG. 5 is a block diagram illustrating embodiments of a communication network.

FIG. 5 depicts an embodiment of a communications network 500. The communications network 500 may use technologies such as LTE, WiMAX etc. In a network 500, a mixture of cells of differently sized and overlapping coverage areas may be deployed. A cell is a geographical area where radio coverage is provided by a base station. For example, the network 500 may comprise a pico cell 501a deployed within the coverage area of a macro cell 501b. The pico cell 501a may be associated with a pico base station 503a. The pico base station 503a serves the pico cell 501a. The macro cell 501b may be associated with a macro base station 503b. The macro base station 503b serves the macro cell 501b. In the following description, the reference number 501 will be used for indicating a cell in general, and the reference number 503 will be used for indicating a base station in general. The base station 503 may be e.g. a pico base station, a macro base station, Home Base Station (HBS), radio base station, e nodeB (eNB), base station, relay, remote radio heads etc, or any other network unit capable to communicate over a radio carrier with a user equipment 505. The user equipment 505 may be present within the cell 501 and served by the base station 503. More than one cell can be associated with one base station. As a network 500 may comprises a plurality of nodes, a base station may, in some embodiments, be called a network node. A base station 503 comprises at least one antenna port (not shown), e.g. antenna port 0. Each antenna port is configured to transmit and receive signals from the base station 503 to e.g. one or more user equipment 505. In other words, each antenna ports comprise receivers and transmitters. Other examples of network nodes are, for instance, positioning nodes, Operations & Maintenance (O&M) nodes etc.

A downlink (DL) is the link from a base station 503 down to one or more user equipments 505, and an uplink (UL) is the link from a user equipment 505 up to a base station 503. A user equipment 505 comprised in the network 500 is assigned to a certain cell, which is referred to as the serving cell.

In the following, the user equipment 505 comprises for example, mobile telephones, pagers, headsets, laptop computers and other mobile terminals, and the like. In a broader sense, user equipment 505 may also be understood as a general wireless device or any device equipped with a radio interface and even small base stations capable of receiving signals in downlink, sensors, relays, etc. fall into this category and thus covered by the current invention.

Figure 1:
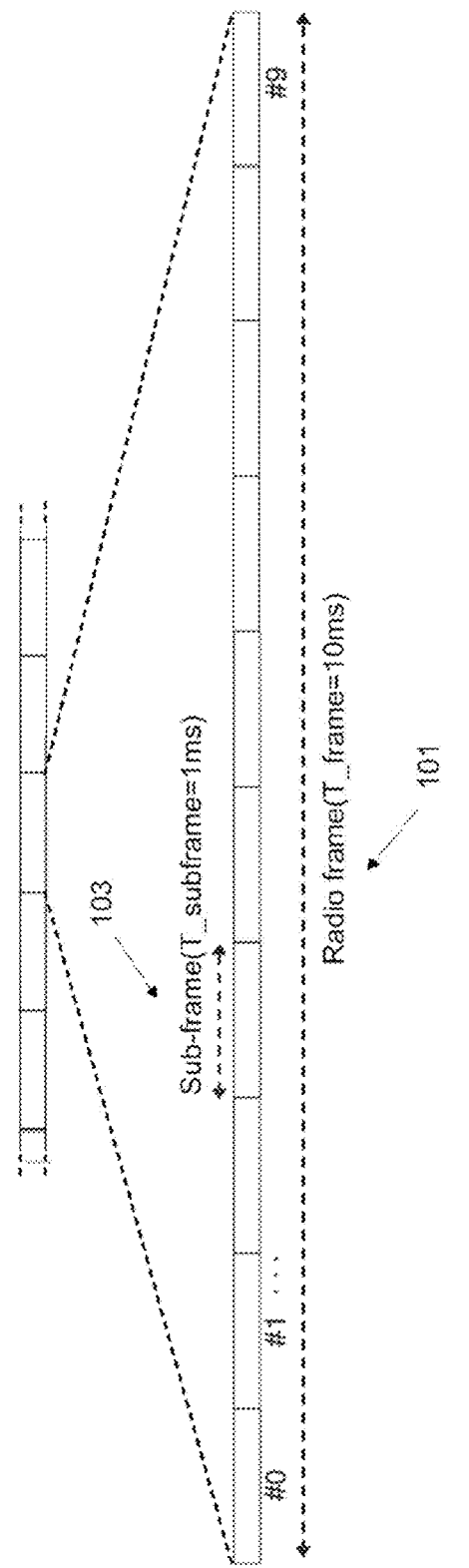
FIG. 1 is a schematic diagram illustrating an exemplary LTE time-domain structure.
Figure 2A:
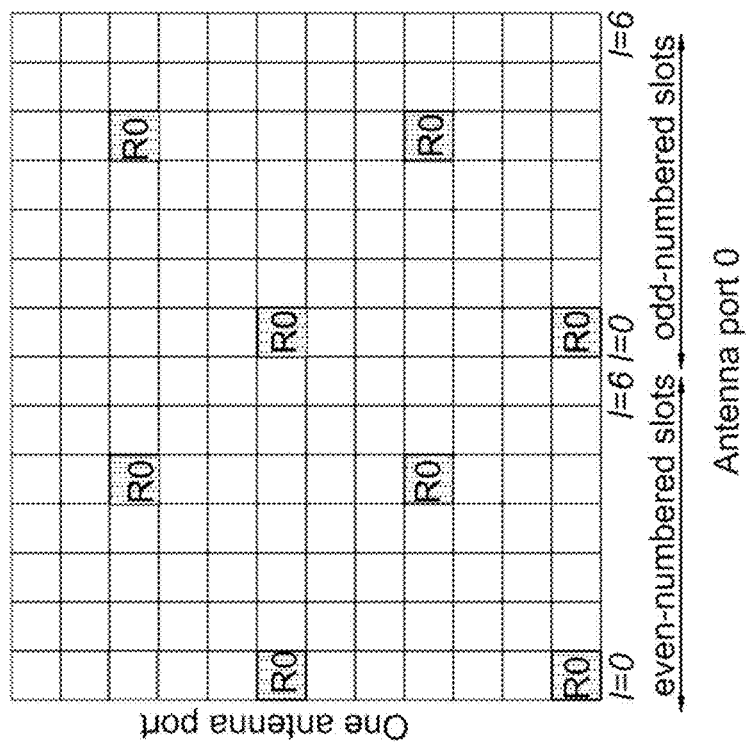
FIG. 2a-c are schematic diagrams illustrating an exemplary resource element allocation of CRS in LTE within one subframe.
Figure 2B:
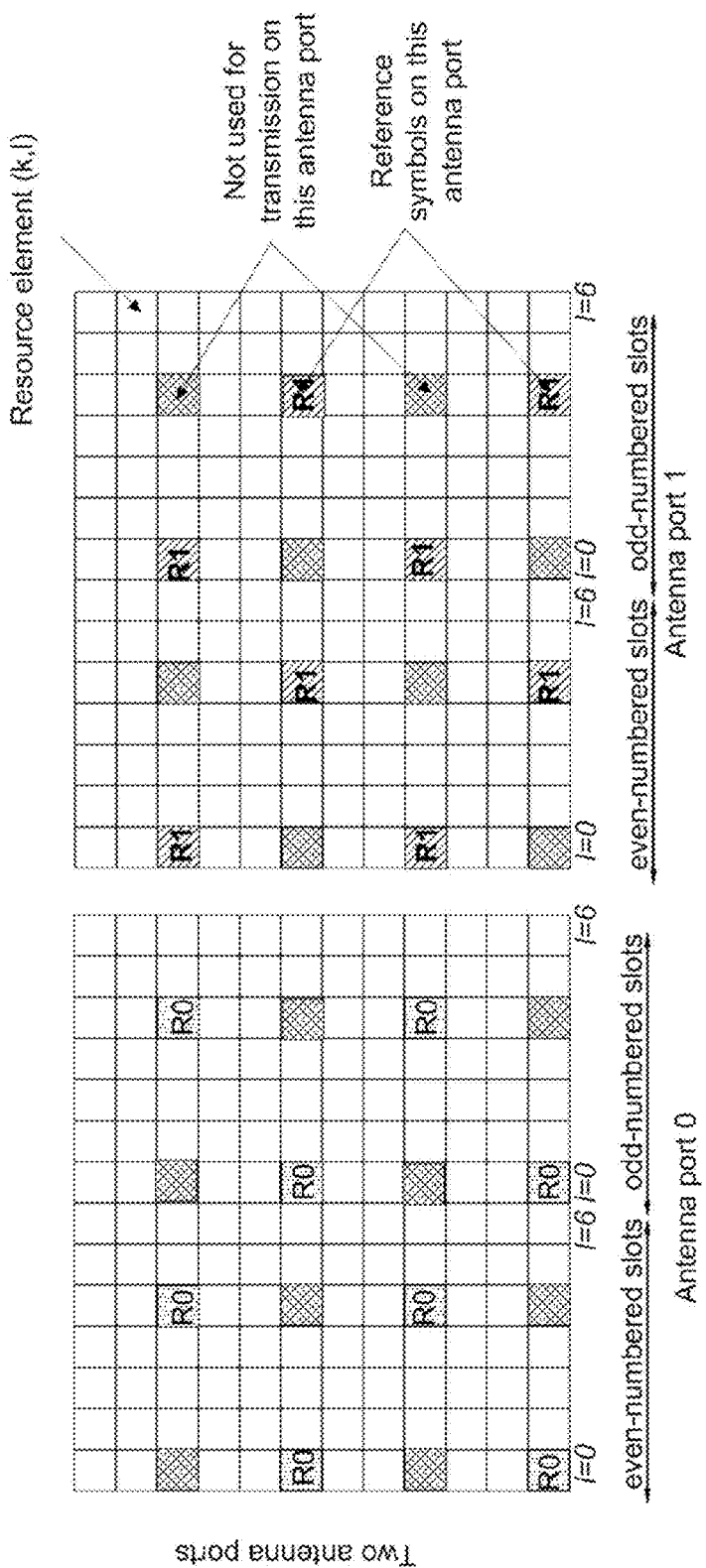
Figure 2C:
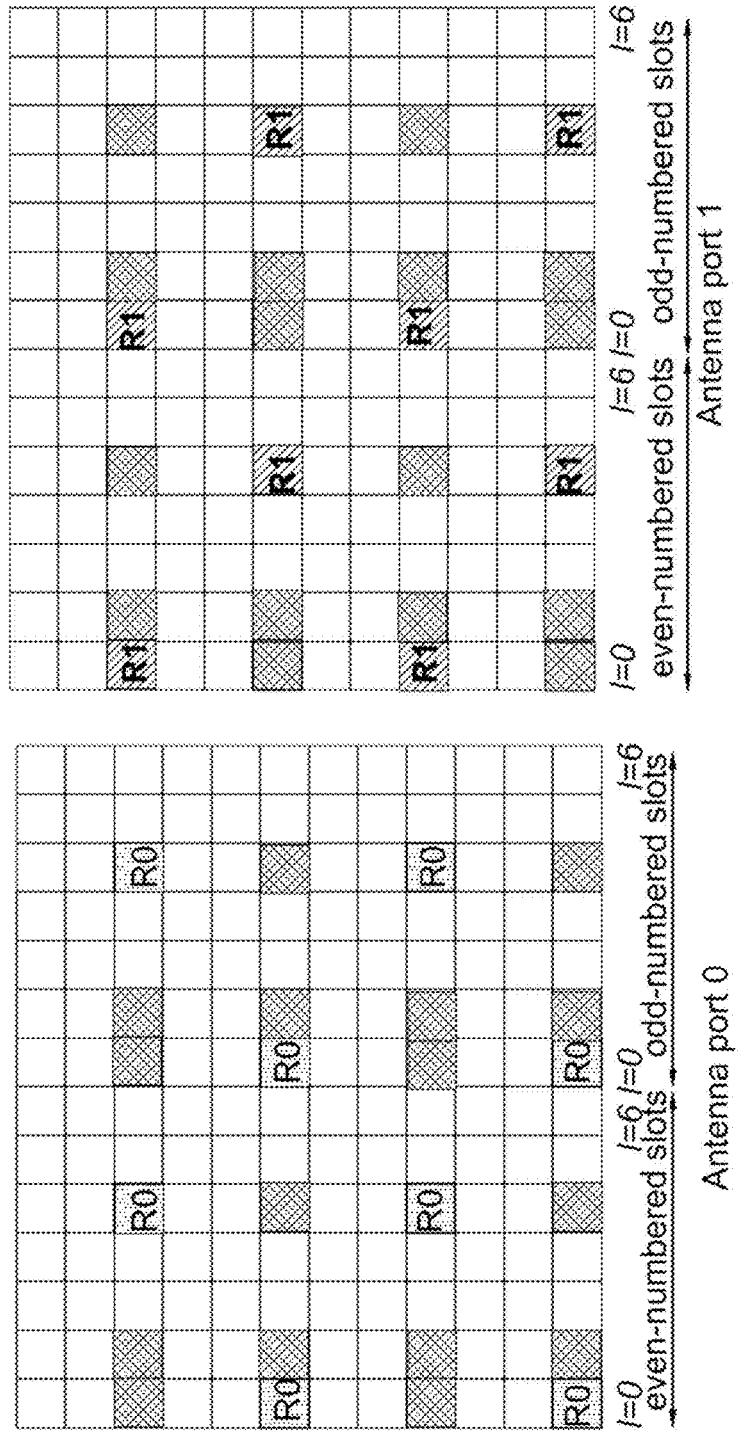
Figure 2C:
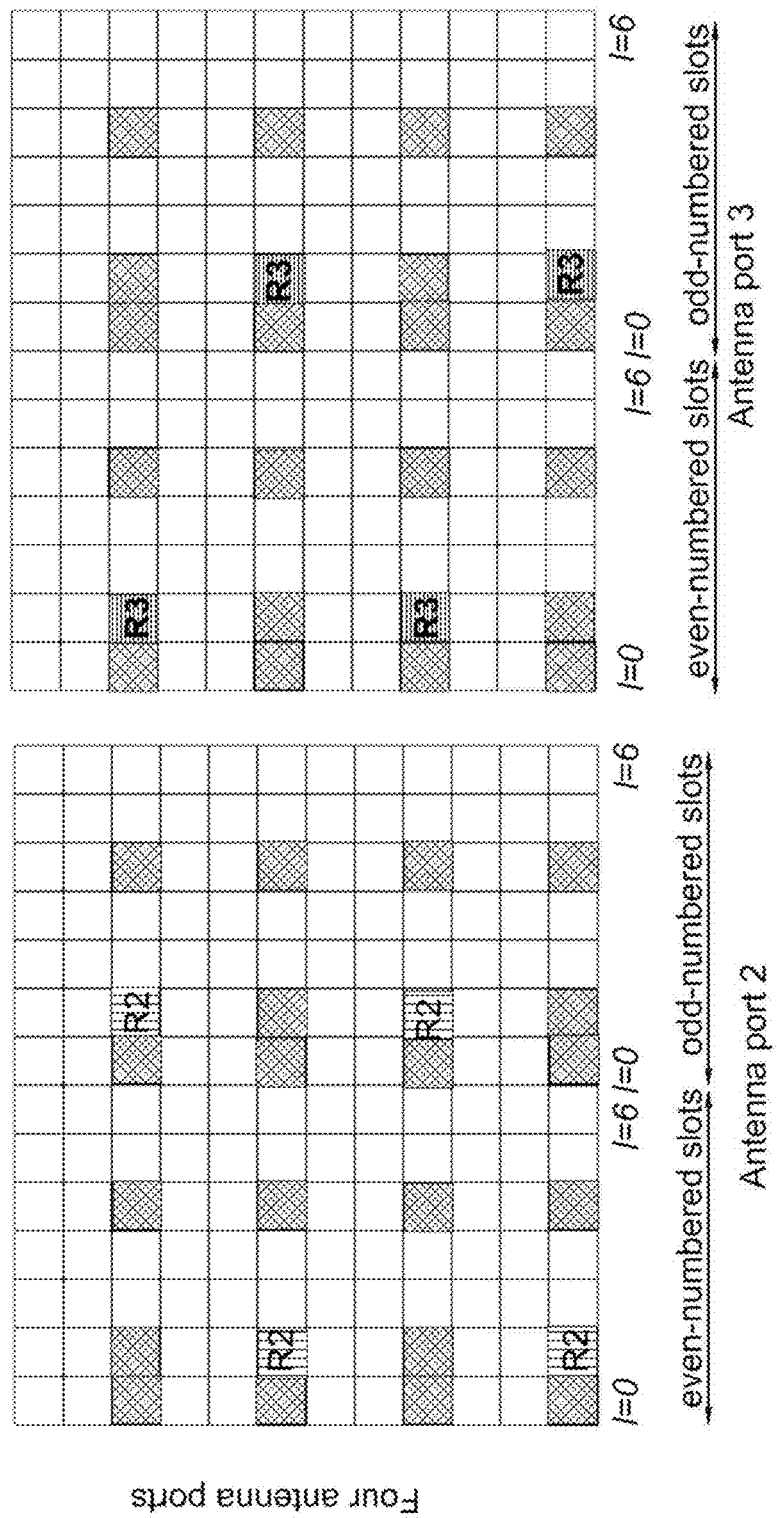
Figure 3:
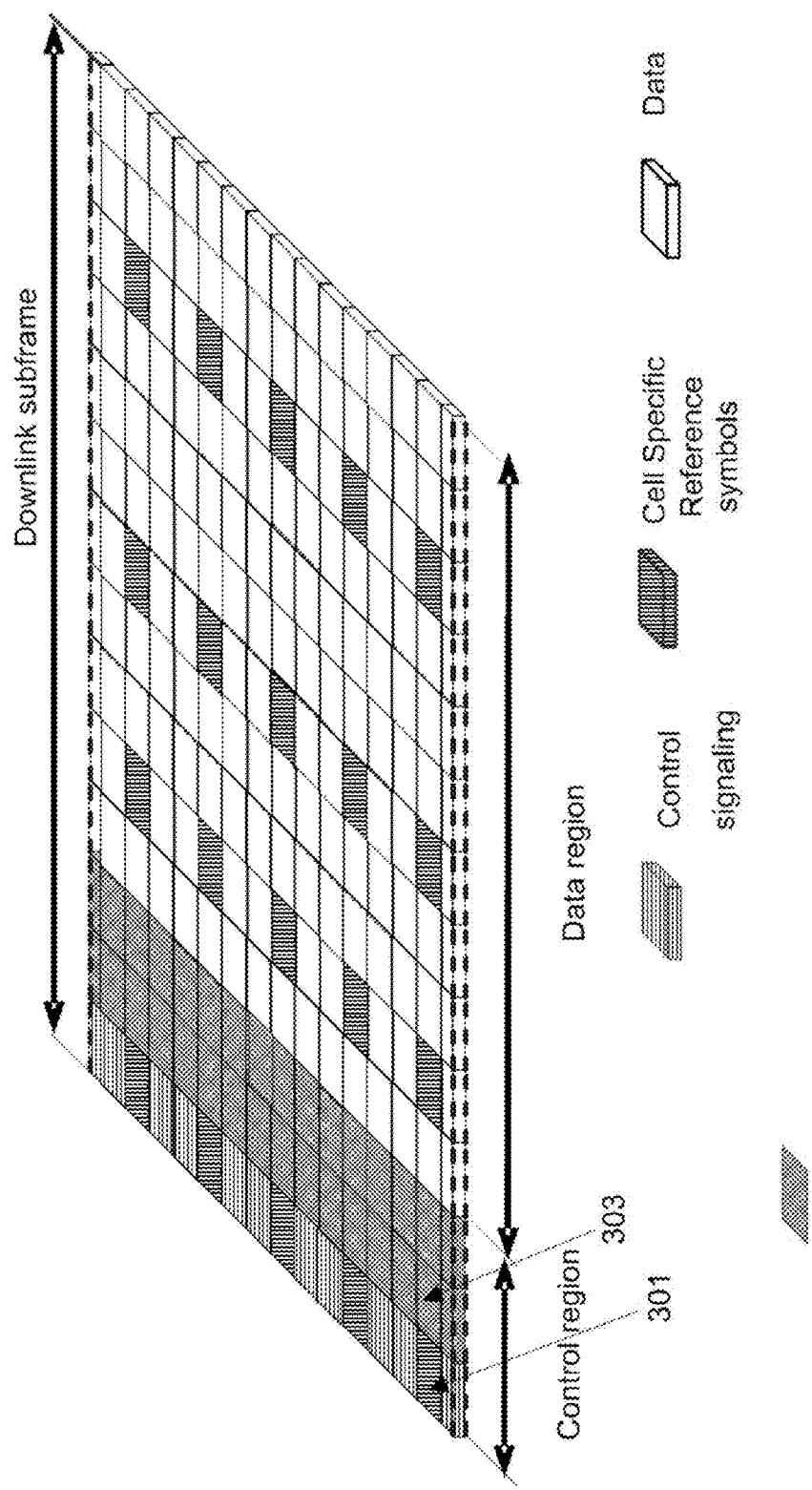
FIG. 3 is a schematic diagram illustrating mapping of physical control/data channels and signals on resource elements in a downlink subframe.
Figure 4:
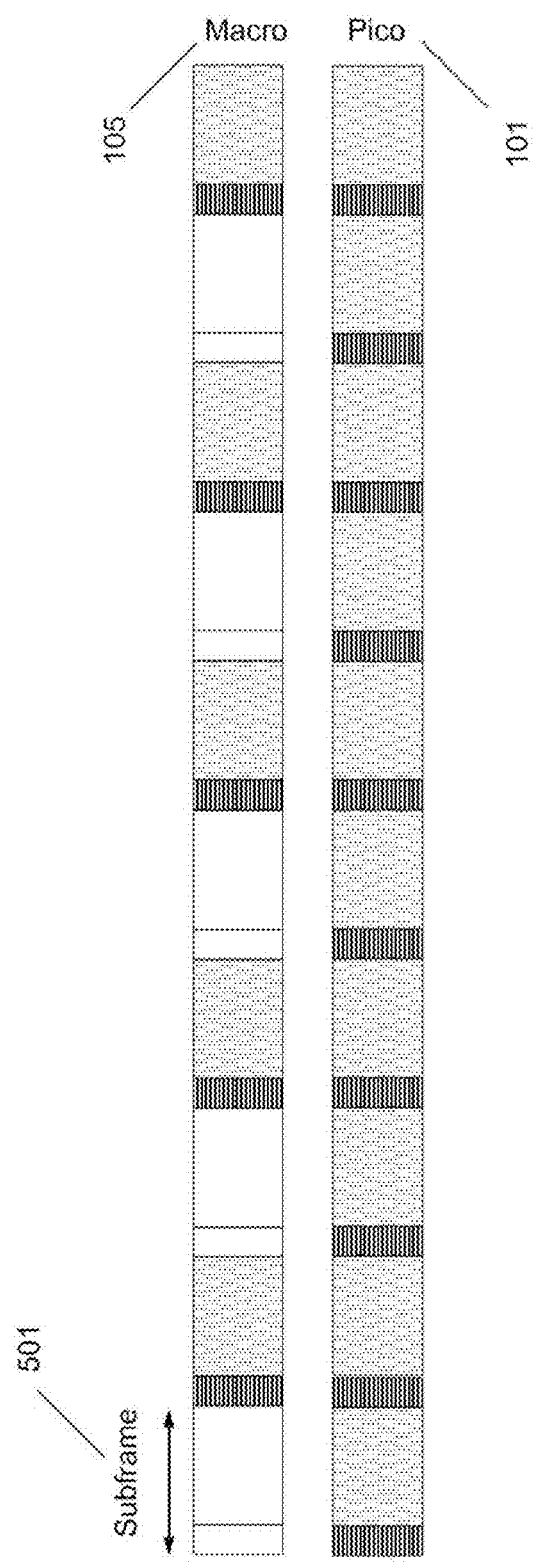
FIG. 4 is a schematic diagram illustrating ICIC using low interference subframes in downlink.

Dynamic Control of the Set of Active Antenna Ports for Physical Signal Transmissions For backward-compatibility reasons, CRS cannot be turned off completely in a subframe 103,401 as illustrated in FIGS. 1 and 4. For example, the 3GPP standard requires that for RSRP determination, the CRS R0, i.e. CRS on antenna port 0, shall be used, meaning that CRS has to always be transmitted at least from antenna port 0. If the user equipment 505 can reliably detect that R1, i.e. CRS on antenna port 1, is available, the user equipment 505 can use R1 in addition to R0 to determine RSRP. Some methods exist for signaling the antenna information, but they are not dynamic and flexible enough to support the operation of heterogeneous network as explained above.

In accordance with embodiments herein, the set of active antenna ports may be activated/deactivated dynamically to control the RS interference. In a specific example, a reduced set of active antenna ports is associated with low-interference subframes, which are used to improve performance of some user equipments, to minimize or avoid RS interference from the strongly interfering cells. The strongly interfering cells may be defined by their absolute or relative, e.g. with respect to the serving cell, signal strength. The cells or base stations may also be sometimes classified as strong interferers when they are associated to base station 503 of a higher power class, e.g. macro cells may be viewed in this way as stronger interferers compared to pico cells Low-interference subframes, seen from the perspective of the user equipment 505, imply a reduced level of received interference. A reduced level of interference may be achieved by e.g. scheduling less user equipments on data channels. A similar effect may be achieved by configuring positioning subframes or empty Multimedia Broadcast/Multicast Service (MBSFN) Single Frequency Network (MBSFN) subframes, without transmitting broadcast data. Further, the interference in the network is improved by including the times corresponding to such subframes. The reduced level of received interface may also be achieved by using Almost Blank Subframes (ABS). ABS may be defined as subframes with reduced transmission power and/or activity. Low-interference subframes may be associated with a time with specific interference conditions.

In relation to antenna ports associated with low-interference subframes, it should be noted this refers to antenna ports seen by the receiver side that face different interference. Thus, the transmitter does not face any interference.

Embodiments of a suitable method will now be described with reference to the combined signaling diagram and flowchart depicted in FIG. 6 and with reference to FIG. 5 illustrating embodiments of a communication network 500. The method comprises at least some of the following steps, which steps may as well be carried out in another suitable order than described below.

Step 601

The base station 503 determines the time when the RS transmissions have to be performed from fewer antenna ports, i.e. when reduced or low interference is desired. The time is associated with low-interference, i.e. low-interference subframes. A subframe may represent a time interval or time period Step 602

The base station 503 determines the set of cells where the reduced set of antenna ports shall apply.

Step 603

The base station 503 determines the reduced set of antenna ports in at least one cell from the set determined in step 602. The fewer antenna ports may comprise a subset of an original set of antenna ports.

Step 604

In some embodiments, the base station 503 informs the user equipment 505 about a temporary change of the set of active antenna ports and (optionally) about a time interval during which the reduced set of antenna ports shall apply. In other words, the base station 503 may or may not inform the user equipment 505 about the time interval.

Step 605

The base station 503 transmits the RS from the reduced set of antenna ports.

Step 606

In some embodiments, the user equipment 505 performs measurements and reporting in the reduced set of antenna ports.

Step 607

The base station 503 re-initiates or restores the RS transmissions from the original set of antenna ports.

Step 608

The base station 503 informs the user equipment 505 about the restored RS transmissions.

Those steps need not to be carried out in the exact order listed above and some steps may be omitted. The steps are described in more detail below, and each step description corresponds to a respective set of separate embodiments. The embodiments may also be combined.

Step 601: Determining the Time when the RS Transmissions have to be Performed from a Fewer Antenna Ports The switch time to a reduced set of active antenna ports, i.e. the switch time to the temporary change, may occur in accordance to a signaled pattern, or periodically or by a trigger.

A signaled pattern may be the same as the pattern of low-interference subframes or almost blank subframes intended to improve the interference situation for user equipment 505 that may otherwise potentially have poor performance.

A trigger for the temporary change may be based, for example, on a determined indication that the interference from a certain cell, e.g., cell 1, causes unacceptable performance degradation in some area of another cell, e.g., cell 2.

The indication may be deduced from a measurement, such as signal quality measurements in cell 2 in that area, and where the indication may be communicated by cell 2 to cell 1 via the X2 interface.

In one embodiment, the indication in cell 1 is received from a network node, e.g., an Operations & Maintenance (O&M) node (not shown), which collects different measurements from different cells. In another embodiment, the indication in cell 1 is deduced by cell 1 itself based on the available measurements.

Step 602: Determining the Set of Cells where the Reduced Set of Antenna Ports Shall Apply Below are possible options for deciding the cells where the set of active antenna ports may be reduced, i.e. the temporary change of active antenna ports:
  a. The set of active antenna ports may be changed in all cells in the network 500, or
  b. The set of active antenna ports may be changed in all macro cells 105, or
  c. The set of active antenna ports may be changed in cells with given overlapping RS patterns, e.g., corresponding to a certain frequency shift, or
  d. The set of active antenna ports may be changed in macro cells with RS patterns overlapping with the RS pattern of a lower-power node in its proximity, or
  e. The reduced set of active antenna ports may be pre-configured by the operator in the selected cells or configured by O&M.

Step 603: Determining the Reduced Set of Antenna Ports in at Least One Cell in the Network In an example, the number of CRS antenna ports is reduced from 2 or larger to 1 antenna port, which means increasing the effective reuse factor, or non-overlapping frequency shifts, from 3 to 6. The set of active antenna ports is configured to avoid interference from at least one strong interferer. In one example, macro cells may be considered as strong interferers compared to pico cells. In another example, CSG femto cells may be considered as strong interferers e.g. compared to pico or macro cells.

In one embodiment, antenna port 0 shall always be included in the set of active antenna ports e.g. when the reference signals are CRS and CRS transmissions are required from at least the antenna port 0, but this may be not necessarily in other embodiments of the present solution.

In another embodiment, the set of active antenna ports in one layer of nodes, e.g., macro layer, is chosen to avoid the overlap with patterns reserved for another layer, e.g., pico node. More details on the reserved patterns are provided below.

In yet another embodiment, the set of active antenna ports is decided depending on the CRS transmission pattern and/or the set of active antenna ports in the interfering neighbor cell, the information on the active set of antenna ports may be exchanged among the neighbor cells over the X2 interface.

Step 604: Informing the UE About the Temporary Change of the Set of Active Antenna Ports and (Optionally) about the Time Periods During which the Reduced Set of Antenna Ports Apply At least two ways of acquiring this information by the user equipment 505 are envisioned: the information is pre-determined and known to the user equipment 505(*a*) or it is signaled by the network to the user equipment 505(*b*).
  (a) The pre-determined information may comprise:
    The reduced set of antenna ports.
    The periodicity of time intervals when the reduced set of antenna ports applies.
    The consecutive time interval when the reduced set of antenna ports applies.
    The configured bandwidth where the reduced set of active antenna ports applies.
    An indication whether it applies to the control region only.
  (b) Information signaled to the user equipment 505:
    An indication that a pre-defined reduced set may be used during a pre-defined interval with a pre-defined periodicity, or
    At least some part of the information described in 604(*a*)

For example, only the number of antenna ports in the reduced set may be signaled, if desired. The signaled information may be by nature user equipment-specific, e.g. user equipments 505 in a challenging area, or cell-specific and thus broadcast, e.g., via one or more suitable information elements in one or more suitable SIBs.

(c) In another embodiment, the user equipment behavior is such that the user equipment 505 may assume that the pre-defined, pre-configured or the signaled reduced set configuration applies starting with the low-interference or almost blank subframes about which the user equipment 505 has the information. Some examples of such information may be the received by the user equipment Almost Blank Subframes (ABS) pattern(s), defined as subframes with reduced transmission power and/or activity, and a measurement pattern signaled over RRC by the serving base station. Another example is a positioning subframe configuration signaled by the network to facilitate positioning. The information about the set of active antenna ports in such subframes may thus be signaled together with the low-interference subframe or almost blank subframe configuration.

Step 605: Transmitting the RS from the Reduced Set of Antenna Ports
  (a) The transmitting the RS from the reduced set of antenna ports may be periodic.
  (b) The pre-defined or pre-configured or dynamically configured reduced set of active antenna ports in a cell is invoked by an event, e.g., triggering together low-interference subframes.

Step 606: Measuring and Reporting in the Reduced Set of Antenna Ports

Some user equipments 505 may conduct some measurements only during the time when the RS are transmitted from the reduced set of antenna ports and the other user equipments (not shown) may not use these subframes for measurements, e.g., when these user equipments 505 are scheduled in such subframes with a low probability. The conducted measurements may also be reported to the network or be used internally in the user equipment 505. Such measurement coordination may be an advantage, for example, when high interference is expected in some subframes so that some user equipments 505 connected to pico cells 501*a* may not able to perform measurements in the se subframes.

Step 607: Restoring the RS Transmissions from the Original Set of Antenna Ports in the Cell
  (a) The restoring may be performed by a stop-trigger, or
  (b) The restoring may be performed after the configured interval is over, or
  (c) The restoring may be performed associated with the end of low-interference subframes.

Step 608: Informing the User Equipment 505 about the Restored RS Transmissions
  (a) The user equipment 505 behavior may be such that the user equipment 505 may assume that the cell switches to the original antenna port configuration for RS in the end of low-interference subframes so the decision is made by the user equipment 505 autonomously, or (b) An indicator may be sent to user equipments 505, e.g., by broadcast via a suitable SIB in the cell, that the original set of antenna ports will be restored.

Figure 7:
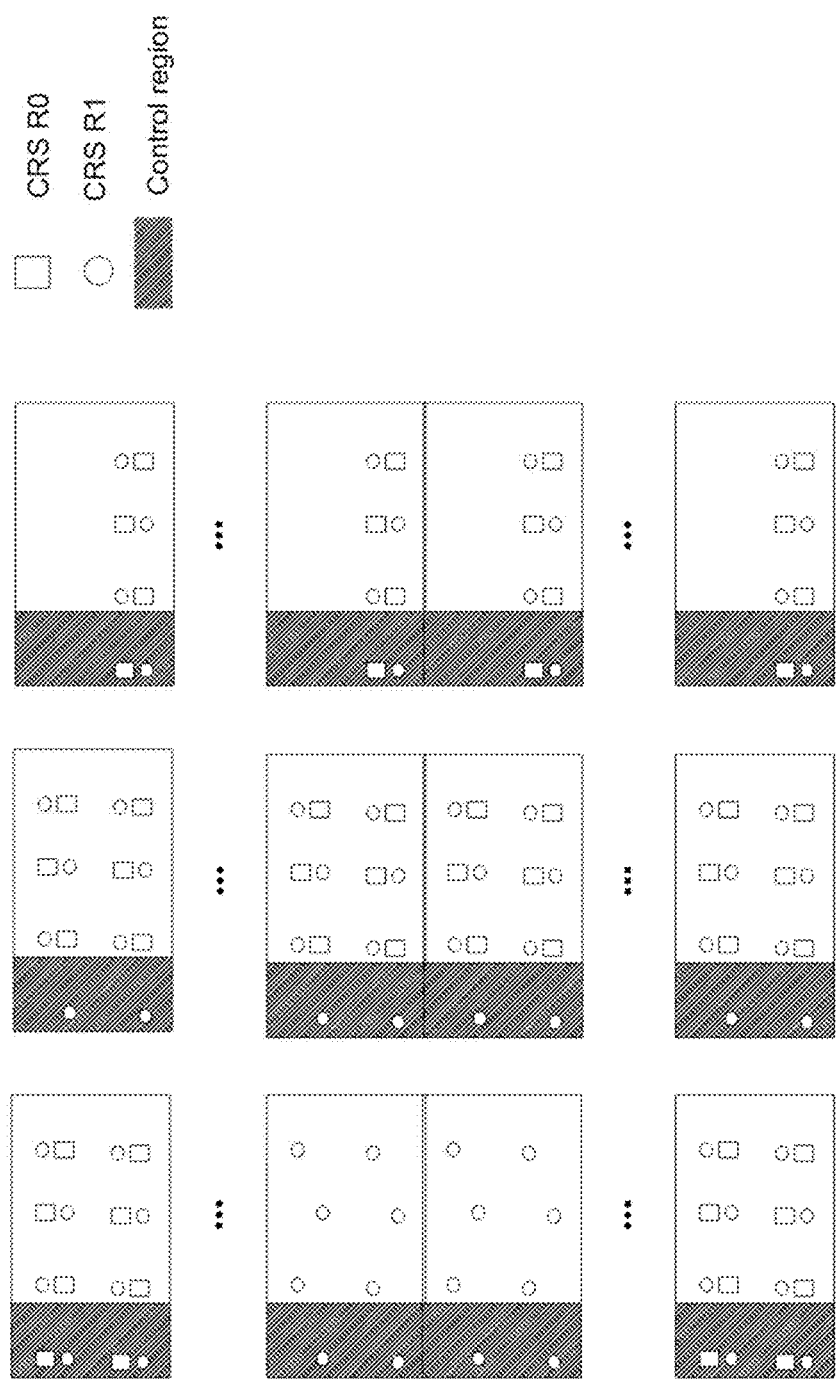
FIG. 7a-c are schematic diagrams illustrating an example of a reduced set of active antenna ports.

Time-Frequency Resources where the Reduced Set of Active Antenna Ports can Apply:

FIGS. 7*a-c* illustrates an example of a reduced set of active antenna ports. The hatched regions illustrate a control region. The squares illustrate CRS reference signals for antenna port 0 and the circles illustrates CRS reference signal for antenna port 1. The reduced set of active antenna ports apply in the following scenarios:

(1) Within the entire resource block, one subframe in time, over the system bandwidth or a configured bandwidth, which may be smaller than the system bandwidth, as illustrated in FIG. 7*a*. or (2) Within the control region of the subframe over the system bandwidth or a configured bandwidth, which may be smaller than the system bandwidth, as illustrated in FIG. 7*b* or (3) Within a subset of subcarriers and/or a subset of symbols of each resource block within a given subframe and over the system bandwidth or a configured bandwidth, which can be smaller than the system bandwidth, as illustrated in FIG. 7*c*.

(a) An example of using fewer transmit antenna ports in a part of the subframe is when that part collides with, for example, synchronization signals in other cells in a asynchronous network, where such blanking can be pre-determined for a given synchronization requirement which would in turn also pre-determine the user equipment measurement behavior.

(b) In one embodiment (not compliant with Release 8), the active set of antenna ports is chosen based on the number of allowed for transmission subcarriers.

RS Transmit Power

With more than one active antenna ports, a cell has a possibility to boost the CRS power by 3 dB by just reusing the power from the resource elements, also referred to as REs, where another CRS is transmitted from another antenna. By configuring one antenna port, the CRS Energy Per Resource Element (EPRE) in the cell is more likely to be at the level assuming the constant EPRE across the transmission bandwidth, which may be viewed as a way to control the CRS EPRE and thus keep the CRS interference from the given cell at a lower level.

Figure 8:
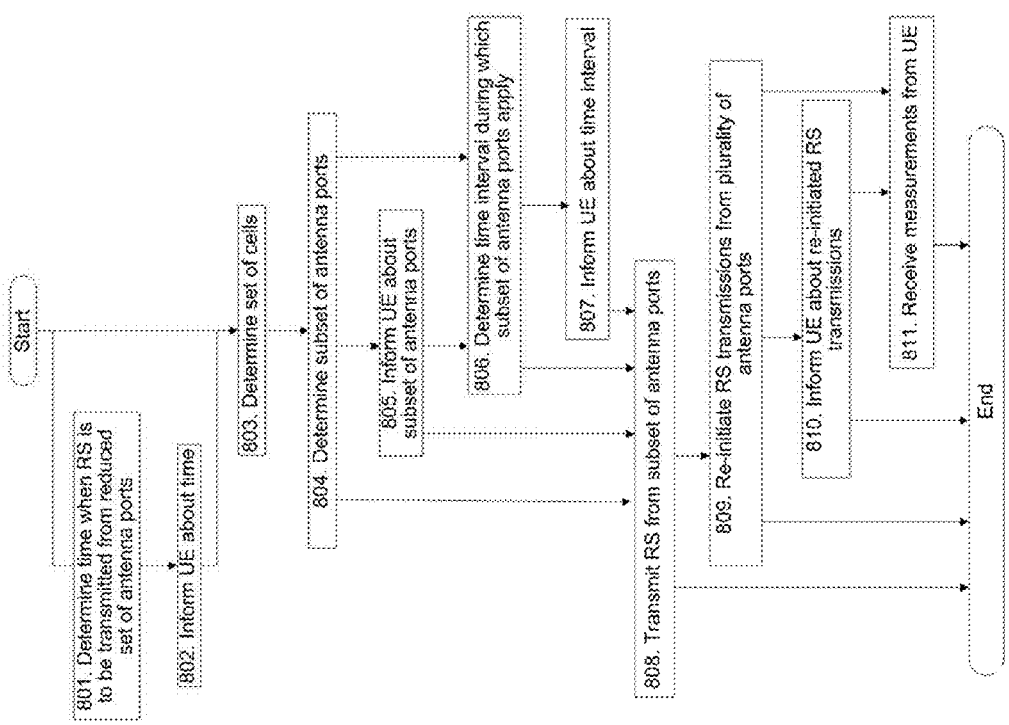
FIG. 8 is a flow chart illustrating embodiments of a method in a base station.

The method described above will now be described seen from the perspective of the base station 503. FIG. 8 is a flowchart describing the present method in the base station 503 for enabling interference coordination in a communication network 500. The base station 503 comprises a plurality of antenna ports. Each antenna port is configured to transmit a reference signal. The reference signals are not specifically transmitted to any user equipment 505, even though the user equipment 505 may receive some assistance in other scenarios. The signaling of the reference signal to a user equipment is not dedicated signal. The reference signal may be received by a plurality of user equipments 505. Each antenna port is associated with a respective cell 101, 105. In some embodiments, a plurality of antenna ports is associated with each respective cell 101, 105. In some embodiments, the interference coordination is implemented with respect to a high interference area of a cell. The method comprises the steps to be performed by the base station 503:

Step 801

Figure 6:
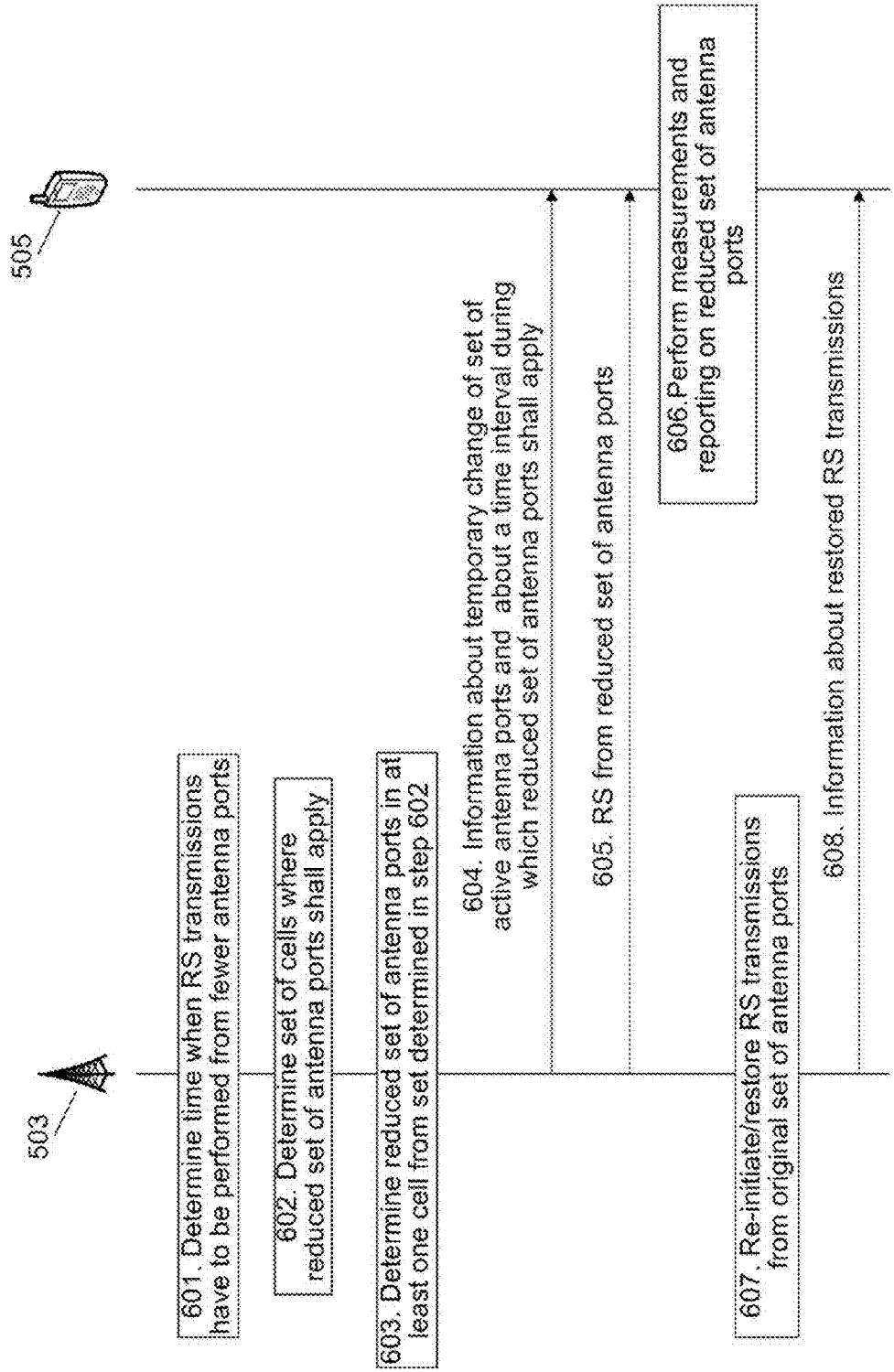
FIG. 6 is a combined signaling diagram and flowchart depicted embodiments of a method.

This step corresponds to step 601 in FIG. 6. In some embodiments, the base station 503 determines a time when the reference signal is to be transmitted from a reduced set of antenna ports. The time is associated with low interference, i.e. low interference subframes. The reference signal is transmitted from the subset of the antenna ports to the user equipment 505 at the determined time.

Step 802

In some embodiments, the base station 503 informs the user equipment 505 about the determined time.

Step 803

This step corresponds to step 602 in FIG. 6. The base station 503 determines a set of cells 101, 105 where transmissions of reference signals is to be performed from a reduced set of the plurality of antenna ports.

In some embodiments, the determined subset of antenna ports is configured to avoid interference from an interfering cell 101, 105 or reduce interference to another cell 501.

Step 804

This step corresponds to step 603 in FIG. 6. The base station 503 determines a subset of antenna ports in at least one cell 501 of the determined set of cells 101, 105. The subset of antenna ports is associated with low interference, i.e. low interference subframes.

In some embodiments, the subset of antenna ports is pre-configured.

In some embodiments, at least one of: the determined time and information of the subset of antenna ports, is obtained from a network node (not shown) in the communication network (500). The network node may be a base station different from the base station 503, i.e. via X2. The network node may be e.g. a radio network node (BS) or another network node such as O&M node.

Step 805

This step corresponds to step 604 in FIG. 6. In some embodiments, the base station 503 informs the user equipment 505 about the subset of antenna ports.

Step 806

This step corresponds to step 604 in FIG. 6. In some embodiments, the base station 503 determines a time interval during which the subset set of antenna ports shall apply.

Step 807

This step corresponds to step 604 in FIG. 6. In some embodiments, the base station 503 informs the user equipment 505 about the time interval.

Step 808

This step corresponds to step 605 in FIG. 6. The base station 503 transmits the reference signal from the subset of antenna ports associated with low interference, i.e. low interference subframes, enabling interference coordination in the communication network 500.

In some embodiments, the reference signal is transmitted to the user equipment 505.

In some embodiments, the transmissions from the reduced set of antenna ports apply to a part of system bandwidth.

In some embodiments, the transmissions from the reduced set of antenna ports in a cell 101, 105 are periodic or invoked by an event.

In some embodiments, the signaling from the base station 503 is not dedicated to a specific user equipment 505, but may be transmitted to a plurality of user equipments 505 in the communication network 500, e.g., the signaling may be cell-specific and transmitted over the cell area, and thus potentially may be used by any user equipment 505 performing measurements on that cell.

In some embodiments, the signaling from the base station 503 is dedicated to a specific user equipment 505.

Step 809

This step corresponds to step 607 in FIG. 6. In some embodiments, the base station 503 re-initiates the reference signal transmissions from the plurality of antenna ports.

Step 810

This step corresponds to step 607 in FIG. 6. In some embodiments, the base station 503 informs the user equipment 505 about the re-initiated reference signal transmissions.

Step 811

This step corresponds to step 606 in FIG. 6. In some embodiments, the base station 503 receives measurements from the user equipment 505.

Figure 9:
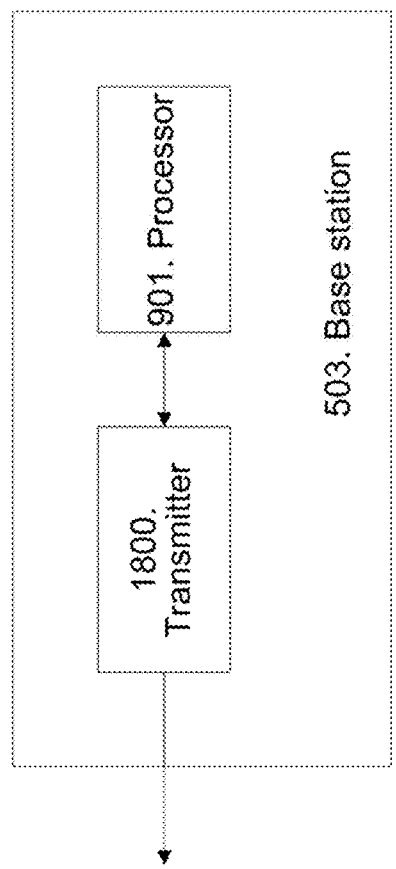
FIG. 9 is a block diagram illustrating an embodiment of a base station.

To perform the method steps shown in FIG. 8 for enabling interference coordination in the communication network 500. The base station 503 comprises a base station arrangement as shown in FIG. 9. The base station 503 comprises a plurality of antenna ports. Each antenna port is configured to transmit a reference signal. Each antenna port is associated with a respective cell 101, 105. In some embodiments, the interference coordination is implemented with respect to a high interference area of a cell.

The base station 503 further comprises a processor 901 which is configured to determine a set of cells 101, 105 where transmissions of reference signals is to be performed from a reduced set of the plurality of antenna ports. The processor 901 is further configured to determine a subset of antenna ports in at least one cell 101, 105 of the determined set of cells 101, 105. In some embodiments, the determined subset of antenna ports is configured to avoid interference from an interfering cell 101, 105 or from another cell 501. In some embodiments, the subset of antenna ports is pre-configured.

The base station 503 further comprises a transmitter 1800 configured to transmit the reference signal from the subset of antenna ports associated with low interference, i.e. low interference subframes, enabling interference coordination in the communication network 500. The transmitter 1800 is described in more detail in relation to FIG. 18 below. In some embodiments, the transmissions from the reduced set of antenna ports apply to a part of system bandwidth. And, in some embodiments the transmissions from the reduced set of antenna ports in a cell 101, 105 are periodic or invoked by an event.

In some embodiments, the processor 901 is further configured to determine a time when the reference signal is to be transmitted from a reduced set of antenna ports. The time is associated with low interference, i.e. low interference subframes. The reference signal is transmitted from the subset of the antenna ports at the determined time. In some embodiments, the processor 901 is further configured to inform the user equipment 505 about the determined time, and to inform the user equipment 505 about the subset of antenna ports. In some embodiments, at least one of the determined time and information of the subset of antenna ports, is obtained from a network node.

In some embodiments, the processor 901 is configured to determine a time interval during which the subset set of antenna ports shall apply, and to inform the user equipment 505 about the time interval.

In some embodiments, the processor 901 is further configured to re-initiate the reference signal transmissions from the plurality of antenna ports, and to inform the user equipment 505 about the re-initiated reference signal transmissions.

In some embodiments, the processor 901 is configured to receive measurements from the user equipment 505.

Figure 10:
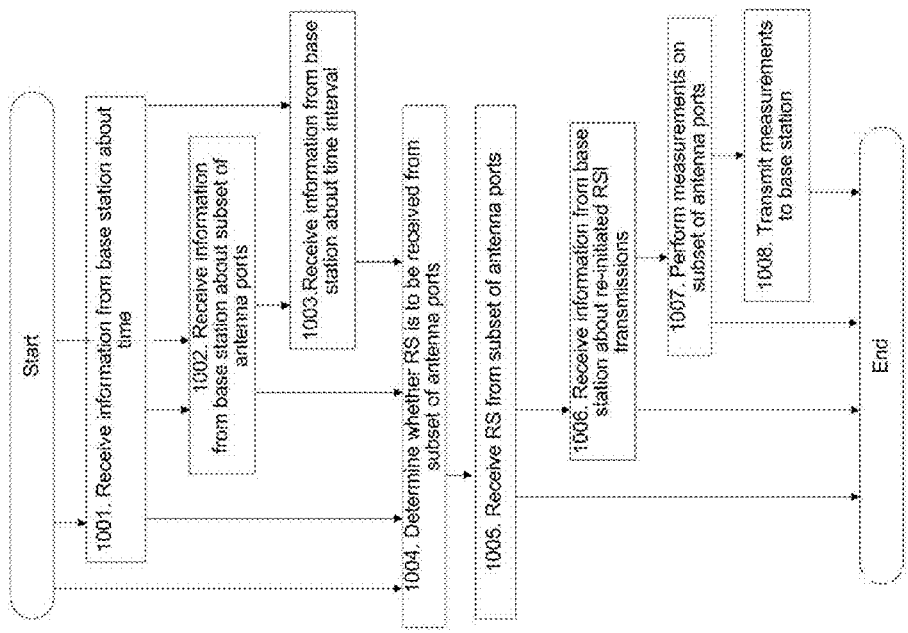
FIG. 10 is a flow chart illustrating embodiments of a method in a user equipment.

The method described above will now be described seen from the perspective of the user equipment 505. FIG. 10 is a flowchart describing the present method in the user equipment 505. The method comprises the further steps to be performed by the user equipment 505:

Step 1001

This step corresponds to step 601 in FIG. 6. In some embodiments, the user equipment 505 receives information from the base station 503 about a time. The time indicates when the reference signal is to be received from a subset of antenna ports. The time is associated with low interference, i.e. low interference subframes.

Step 1002

This step corresponds to step 604 in FIG. 6. In some embodiments, the user equipment 505 receives information from the base station 503 about the subset of antenna ports.

In some embodiments, the subset of antenna ports is pre-defined.

In some embodiments, the subset of antenna ports is pre-defined for a layer of nodes.

Step 1003

This step corresponds to step 604 in FIG. 6. In some embodiments, the user equipment 505 receives information from the base station 503 about a time interval. The time interval indicates a time period during which the subset set of antenna ports shall apply.

In some embodiments, the information about the time interval comprises an indication on whether a subset of antenna ports applies or not in the time associated with low interference subframes, i.e. specific interference conditions, e.g. when only pico cells are transmitting and thus the expected interference is only from pico cells.

Step 1004

The user equipment 505 determines whether a reference signal is to be received during specific interference conditions. In other words, the user equipment 505 determines whether a reference signal is to be received from a subset of antenna ports associated with low interference, i.e. low interference subframes. The subset of antenna ports is comprised in a base station 503. The subset of antenna ports is associated with at least one cell 501.

In some embodiments, the determining whether a reference signal is to be received from a subset of antenna ports is based on at least one of a reference signal pattern and a set of active antenna ports in an interfering neighbour cell 501. The antenna port information is exchanged over the X2 interface. The set of active antenna ports is determined depending on the CRS transmission pattern and/or the set of active antenna ports in the interfering neighbour cell. In other words, the information on the active set of antenna ports can be exchanged among the neighbour cells over the X2 interface.

Step 1005

This step corresponds to step 605 in FIG. 6. The user equipment 505 receives a reference signal from the subset of antenna ports. The subset of antenna ports is comprised in a base station 503.

In some embodiments, the reference signal is received from the subset of the antenna ports at the time.

Step 1006

This step corresponds to step 607 in FIG. 6. In some embodiments, the user equipment 505 receives information from the base station 503 about re-initiated reference signal transmissions.

Step 1007

This step corresponds to step 606 in FIG. 6. In some embodiments, the user equipment 505 performs measurements on the subset of antenna ports.

Step 1008

This step corresponds to step 606 in FIG. 6. In some embodiments, the user equipment 505 transmits the measurements to the base station 503.

Figure 11:
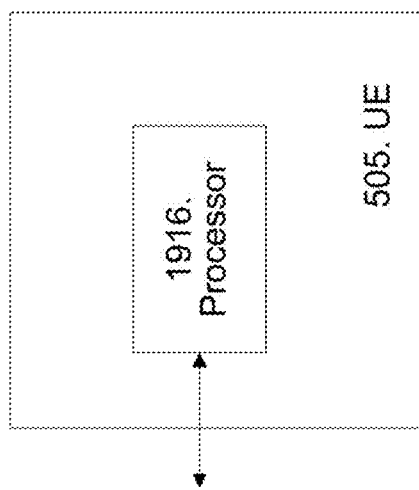
FIG. 11 is a block diagram illustrating an embodiment of a user equipment.
Figure 19:
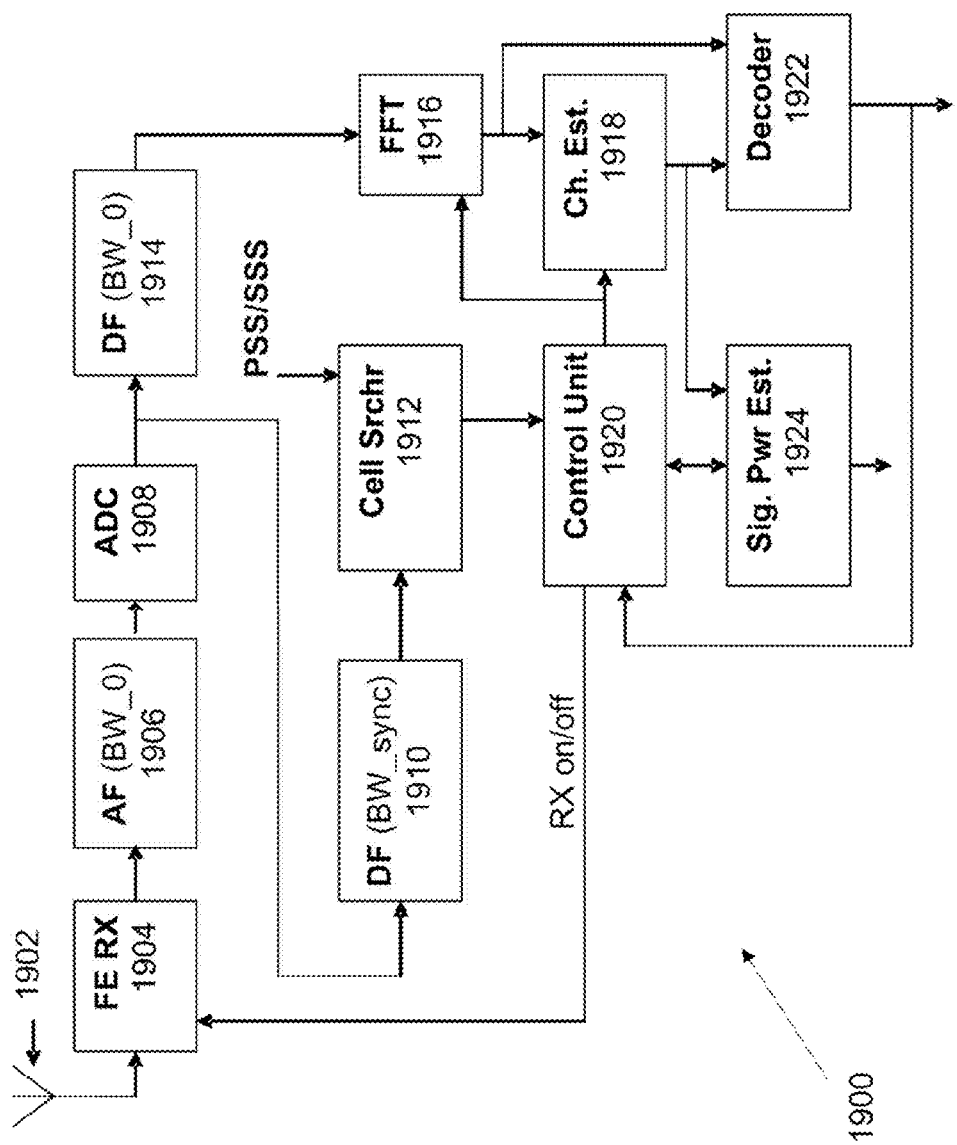
FIG. 19 is a block diagram illustrating an embodiment of a user equipment arrangement.

To perform the method steps shown in FIG. 10 the user equipment 505 comprises a user equipment arrangement as shown in FIG. 11 and FIG. 19. The user equipment 505 comprises a processor 1916 which is configured to receive a reference signal from a subset of antenna ports. The subset of antenna ports is comprised in a base station 503.

In some embodiments, the subset of antenna ports is pre-defined, and in some embodiments the subset of antenna ports is pre-defined for a layer of nodes. The processor 1916 is further configured to determine whether the reference signal is to be received from a subset of antenna ports being comprised in a base station 503. The subset of antenna ports is associated with at least one cell 501. The user equipment arrangement is further described in relation to FIG. 19 below.

In some embodiments, the processor 1916 is further configured to receive information from the base station 503 about a time. The time indicates when the reference signal is to be received from a subset of antenna ports, and the time is associated with low interference, i.e. low interference subframes. In some embodiments, the reference signal is received from the subset of the antenna ports at the time.

In some embodiments, the processor 1916 is further configured to receive information from the base station 503 about the subset of antenna ports.

In some embodiments, the processor 1916 is further configured to receive information from the base station 503 about a time interval. The time interval indicates a time period during which the subset set of antenna ports shall apply. In some embodiments, the information about the time interval comprises an indication on whether a subset of antenna ports applies or not in the time associated with low interference subframes, i.e. associated with specific interference conditions.

In some embodiments, the processor 1916 is further configured to receive information from the base station 503 about re-initiated reference signal transmissions.

In some embodiments, the processor 1916 is further configured to perform measurements on the subset of antenna ports. In some embodiments, the antenna 1902 is further configured to transmit the measurements to the base station 503.

Method and Apparatus for Assisted User Equipment Measurement Processing

The user equipment 505 receives the assistance information from the network about the strongest interferer(s) and, based on this information, the user equipment 505 selects the desired number of the most critical interferers and use the information to improve the control channel decoding, CRS measurements, channel estimation, e.g., by not including the unreliable part of the channel information, etc.

The assistance data may comprise one or more of:
- A set of PCIs (Physical Cell Identifier), based on which the user equipment 505 can, for example, determine the RS pattern.
- Transmit bandwidth of the interferers.
- Channel-related information or the information based on which the channel information may be deduced, e.g., exploit the channel reciprocity in TDD.
- Number of antenna ports.

The assistance information may be signaled together with the configuration of the low transmission activity pattern determining when low-interference subframes or almost blank subframes occur. The assistance data may be tailored specifically for heterogeneous networks, e.g., includes the information for specific layer nodes, e.g., about only the cells with higher transmit power than the current one or only the CSG cells.

The assistance data are typically transmitted to a certain user equipment 505. That user equipment 505 is connected to the network 500 and is assigned to a certain cell, which is then the serving cell.

In one embodiment, the assistance data is signaled by the serving cell which in turn either autonomously obtains this information, e.g., based on collected measurements or from the O&M, or receives this information from another node, e.g., the interfering macro cell "identifies" itself via the X2-interface to the pico cells 501a located in the range of that macro cell 501b coverage.

In another embodiment, the assistance data is transmitted to the user equipment 505 to assist in its operation in the identified specifically challenging interference conditions and may thus be triggered when such a condition is detected. E.g. when the user equipment 505 enters a Closed Group Subscriber (CSG) cell coverage area but cannot connect to the cell the macro cell 501b can signal the assistance information to the user equipment 505 which includes also the identity of the Home eNB (HeNB). The Home NodeB is the base station 505 of the CSG cell. CSG is called "Closed subscriber group" because even if the user equipment 505 can detect a strong signal, and good signal quality, for that cell, the user equipment 505 cannot connect to it, i.e. "Closed . . . " This leaves the macro cell 501b being the serving cell for that user equipment 505.

In yet another embodiment, the assistance data is extracted by the user equipment 505 autonomously from a special-purpose assistance data signaled by the network 500, e.g.:
- From the OTDOA positioning assistance data which the user equipment 505 may receive being positioned or may request from the network by sending a positioning request which may indicate a preferred positioning method, e.g., Observed Time Difference of Arrival (OTDOA), for which the assistance data of interest may be expected.
- From the mobility lists comprising at least the identities of neighbor cells, which in most cases will be also the strongest interferers.

Methods and apparatus for assisted user equipment measurement processing will now be described with reference to the flowchart depicted in FIG. 12. The methods and apparatus are configured to implement at least the following:

Step 1201

The user equipment 505 identifies the set of strongest interferers, using one of the approaches described above.

Step 1202

The user equipment 505 decides the set of the most crucial interferers, i.e., the set may be smaller than that obtained in Step 1201 due to, for example, user equipment 505 capability. The decision may also account for efficient cell grouping, and identifying deriving the set of the time-frequency resources affected by these interferers by utilizing the knowledge of the RS transmit pattern.

Step 1203

The user equipment performs puncturing on the identified time-frequency resources when measuring the signal in the user equipment 505 side. In more detail, puncturing of time-frequency resources is equivalent to excluding the identified time-frequency resources or setting the weights on the identified time-frequency resources to zero when performing measurements.

Figure 13:
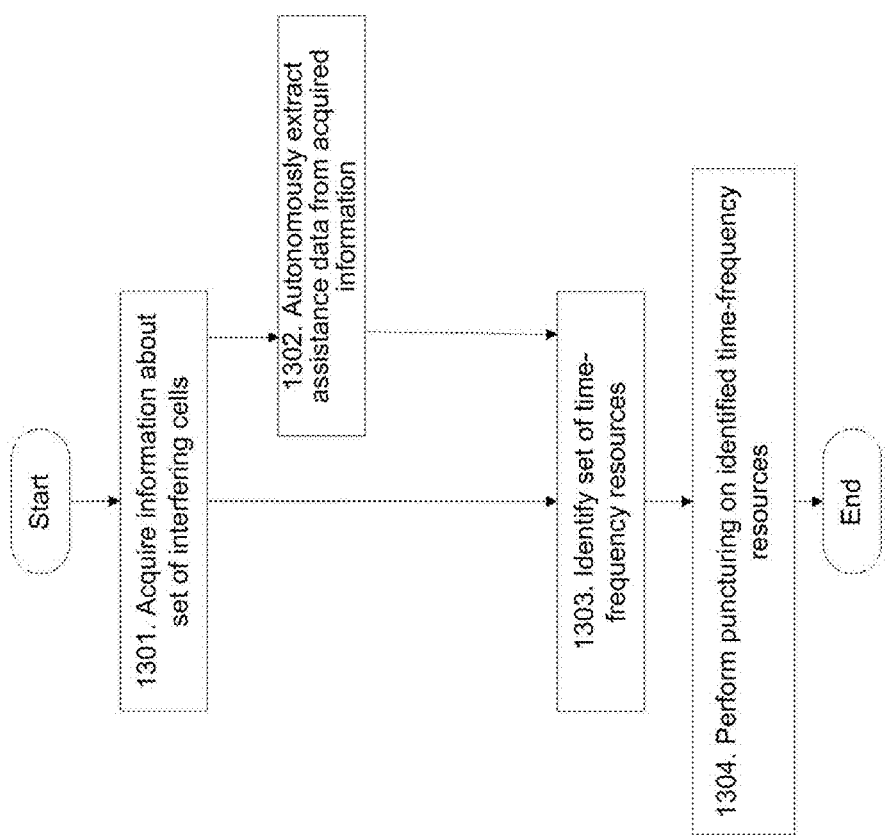

The method described above for assisted user equipment measurement processing will now be described seen from the perspective of the user equipment 505. The method in the user equipment may be transparent to the network, and will enable interference mitigation in the communication network 500. The user equipment 505 is associated with a cell 501 of a plurality of cells in a communication network 500. FIG. 13 is a flowchart describing the present method in the user equipment 505. The method comprises the steps to be performed by the user equipment 505:

Step 1301

Figure 12:
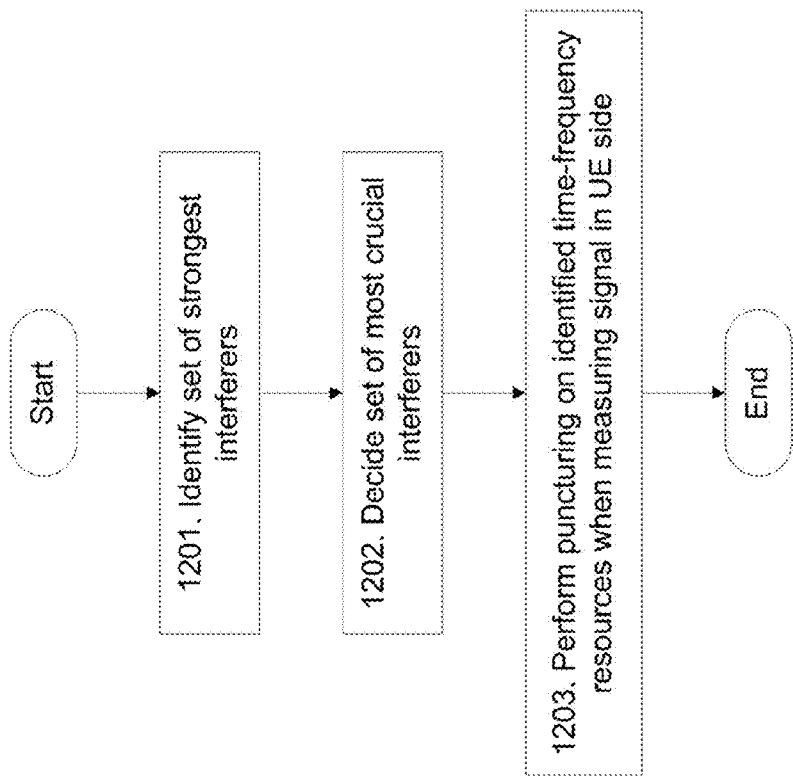
FIGS. 12&13 are flow charts illustrating embodiments of a method in a user equipment.

This step corresponds to step 1201 in FIG. 12. The user equipment 505 acquires information about a set of interfering cells 501 among the plurality cells 501. The set of interfering cells are strong interferes. The acquiring of information may be performed by extracting, see step 1302, or receiving the information.

In some embodiments, each cell in the set of interfering cells is associated with a strong interfering signal, which strong interfering signal has a signal strength above a threshold.

In some embodiments, the information about interfering cells 501 comprises assistance data.

In some embodiments, the assistance data comprises at least one of a set of physical layer cell identities, a transmit bandwidth of an interfering cell 501, channel-related information and a number of antenna ports.

In some embodiments, the information about interfering cells 501 is acquired, i.e. received, from a serving cell or a network node (not shown) within the communication network 500.

The network node may be a radio network node and nonradio network nodes, e.g., a positioning node or other coordinating node. For the sake of simplicity, only radio network nodes are shown in FIG. 5.

For example, OTDOA assistance data may be received from a network node which is not a radio node, but for example a positioning node in the core network. Ultimately in the physical layer, the data are of transmitted by the radio base station over the radio link to the user equipment 505, but the information is transmitted over a higher-layer protocol which is between the positioning node and user equipment 505 and the transmitted data are then transparent to the radio base station. In another example, the information may be transmitted by the serving or other radio base station, and in this case it any radio network node 503.

In some embodiments, the set of interfering cells 501 is a subset of the set of interfering cells. The subset of cells may be based on at least one of: user equipment capability, cell grouping, a desired number of most critical interfering cells to account for puncturing, and impact on an interference level.

Step 1302

This step corresponds to step 1201 in FIG. 12. In some embodiments, the user equipment 505 autonomously extracts the assistance data from the acquired information.

Step 1303

This step corresponds to step 1203 in FIG. 12. The user equipment 505 identifies a set of time-frequency resources affected by the subset of interfering cells 501.

In some embodiments, the identifying a set of time-frequency resources is based on a reference signal transmit pattern.

Step 1304

This step corresponds to step 1203 in FIG. 12. The user equipment 505 performs puncturing on the identified time-frequency resources. In more detail, Puncturing of time-frequency resources is equivalent to excluding the identified time-frequency resources or setting the identified time-frequency resources to zero.

To perform the method steps shown in FIG. 13 for assisted user equipment measurement processing, the user equipment 505 comprises a user equipment arrangement as shown in FIG. 11 and FIG. 19. The user equipment 505 is associated with a cell 501 of a plurality of cells 501 in a communication network 500.

The user equipment 505 comprises a processor 1916 configured to acquire, i.e. extract or receive, information about a set of interfering cells 501 among the plurality of cells 501. In some embodiments, the information about interfering cells 501 is received from a serving cell or a network node within the communication network 500.

In some embodiments the set of interfering cells 501 is a subset of the set of interfering cells, which subset of cells is based on at least one of: user equipment capability, cell grouping, a desired number of most critical interfering cells to account for puncturing, and an impact on an interference level.

The processor 1916 is further configured to identify a set of time-frequency resources affected by the set of interfering cells 501, and to perform puncturing on the identified time-frequency resources.

In some embodiments, the identifying a set of time-frequency resources is based on a reference signal transmit pattern.

In some embodiments, the assistance data comprises at least one of a set of physical layer cell identities, a transmit bandwidth of an interfering cell 501, channel-related information and a number of antenna ports.

In some embodiments, the processor 1916 is further configured to autonomously extracting the assistance data from the acquired information.

Figure 14:
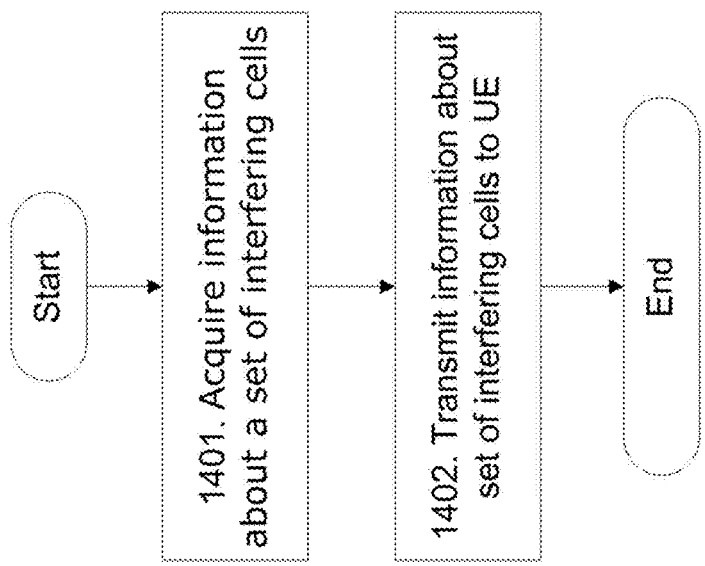
FIG. 14 is a flow chart illustrating embodiments of a method in a network node.

The method described above for assisted user equipment measurement processing which enables interference coordination in a communication network 500 will now be described seen from the perspective of the network node 503. The network node 503 is associated with a cell 501. The network node 503 comprises information about a set of interfering cells 101, 105. FIG. 14 is a flowchart describing the present method in the network node 503. The method comprises the steps to be performed by the network node 503:

Step 1401

This step corresponds to step 1201 in FIG. 12. The network node 503 acquires information about a set of interfering cells 501 among the plurality cells 501. The set of interfering cells are strong interferes. The acquiring of information may be performed by extracting, or receiving the information.

In some embodiments, the information about interfering cells 501 comprises assistance data.

In some embodiments, the assistance data comprises at least one of a set of physical layer cell identities, a transmit bandwidth of an interfering cell 501, channel-related information and a number of antenna ports.

In some embodiments, the information about interfering cells 501 is acquired, i.e. received, from a serving cell or another network node (not shown) within the communication network 500.

In some embodiments, the set of interfering cells 501 is a subset of the set of interfering cells, which subset of cells is based on at least one of: user equipment capability, cell grouping, a desired number of most critical interfering cells to account for puncturing, and an impact on an interference level.

In some embodiments, each cell in the set of interfering cells is associated with a strong interfering signal, which strong interfering signal has a signal strength above a threshold.

Step 1402

This step corresponds to step 1201 in FIG. 12. The network node 503 transmits information about a set of interfering cells 501 among a plurality of cells 501 to a user equipment 505. The set of interfering cells 501 are strong interferers, enabling interference coordination in the communication network 500.

In some embodiments, the information about interfering cells 501 comprises assistance data. In some embodiments, the assistance data comprises at least one of a set of physical layer cell identities, a transmit bandwidth of an interfering cell 501, channel-related information and a number of antenna ports.

In some embodiments, the network node 503 is associated with an interfering macro cell 501b.

In some embodiments, the transmitting information about the set of interfering cells is triggered upon detecting challenging interference conditions for the user equipment 505 in the communication network 500.

Figure 15:
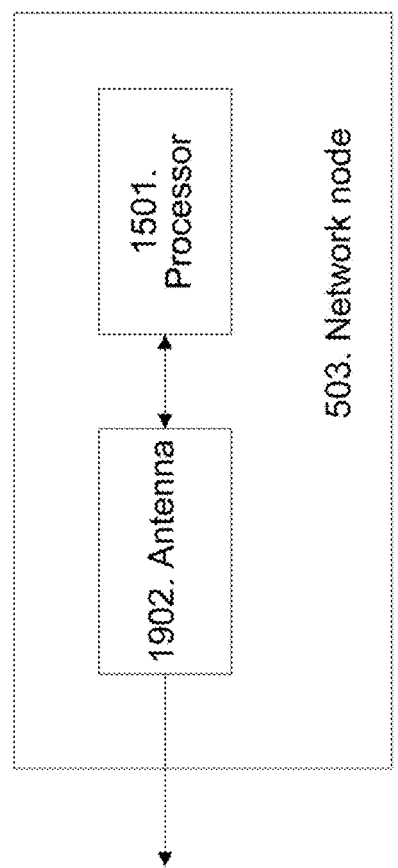
FIG. 15 is a block diagram illustrating an embodiment of a network node.

To perform the method steps shown in FIG. 14 for enabling interference coordination in a communication network 500 the network node 503 comprises a network node arrangement as shown in FIG. 15. The network node 503 is associated with a cell 501. The network node 503 comprises information about a set of interfering cells 101, 105.

The network node 503 comprises a processor 1501 configured to acquire information about a set of interfering cells 501 among a plurality cells 501.

Further, the network node comprises one or more antennas 1902 configured to transmit 1201 the information about the set of interfering cells 501 among a plurality cells 501 to a user equipment 505. The transmitted information is based on the acquired information. The set of interfering cells 501 are strong interferers, enabling interference coordination in the communication network 500. In some embodiments, the information about interfering cells 501 comprises assistance data. In some embodiments, the network node 503 is associated with an interfering macro cell 501b. In some embodiments, the one or more antenna(s) 1902 are further configured to transmit the information about the set of interfering cells to the user equipment 505 when challenging interference conditions for the user equipment 505 are detected in the communication network 500. The challenging interference conditions may, for example, comprise a received signal quality level below a certain threshold reported by the user equipment 505, radio link failure statistics for that user equipment 505, or low signal quality expected for the user equipment 505 based on the network knowledge about the serving cell and interfering neighbor cells for that user equipment 505, which may also be complemented with the knowledge about the expected relative received signal strengths of these cells for the user equipment 505.

The present mechanism for enabling interference coordination in the communication network 500 may be implemented through one or more processors, such as a processor 1501 depicted in FIG. 15, together with computer program code for performing the functions of the present solution.

Methods and Apparatus for Enhanced Cell Planning Adopted for Heterogeneous Network Deployments In accordance with embodiments herein, a subset of RS patterns, e.g., a subset of 6 possible frequency shifts for CRS, is reserved for at least one layer of node, e.g., low-power nodes, and this information is used for deciding the active set of antenna ports. With such a reservation, the macro-cell CRS interference to CRS of low-power nodes may be avoided. The signal patterns comprise one or more pattern identities.

In one embodiment, the low-power node fetches, i.e. requests, the reserved pattern identity, or alternatively, own PCI, from the macro network, e.g., from O&M, which signals this information in reply. This can be done by a newly installed low-power node which "joins" the network 500.

In a scenario with sparsely located low-power nodes, the reserved set comprises one RS pattern. But in general, the set of available reserved pattern identities is dynamically maintained by the network 500, e.g., the hosting macro cell, and it depends on the pattern in use in the area.

Using the reserved set of patterns for one layer, e.g., pico nodes, in combination with almost blank subframes, i.e. no control and/or data transmissions, allows to completely avoid CRS interference between the layers when the reserved patterns for one layer are orthogonal to those used by the other-layer nodes.

In one embodiment, the reserved set of patterns is designed accounting for the set of active antenna ports to be used by the other layer in low-interference or almost blank subframes. For example:

If the set of active antenna ports is empty, which may be possible in future 3GPP Releases, for the macro layer in some area, then all patterns may be reused by the other layer of nodes in the same area.

If one antenna port is to be used by the macro layer, e.g., the set of active antenna ports comprises one antenna port, then the effective CRS pattern reuse is six, so one or two patterns, or even more, depending on the low-power node density, can be reserved for the other layer.

If two to four antenna ports are to be used by the macro layer, then the effective CRS pattern reuse is three, so one pattern could then be reserved for the other layer leaving two orthogonal patterns to the macro layer.

It is straightforward that such a reservation scheme can be designed for any number of layers of nodes in the network.

Figure 16:
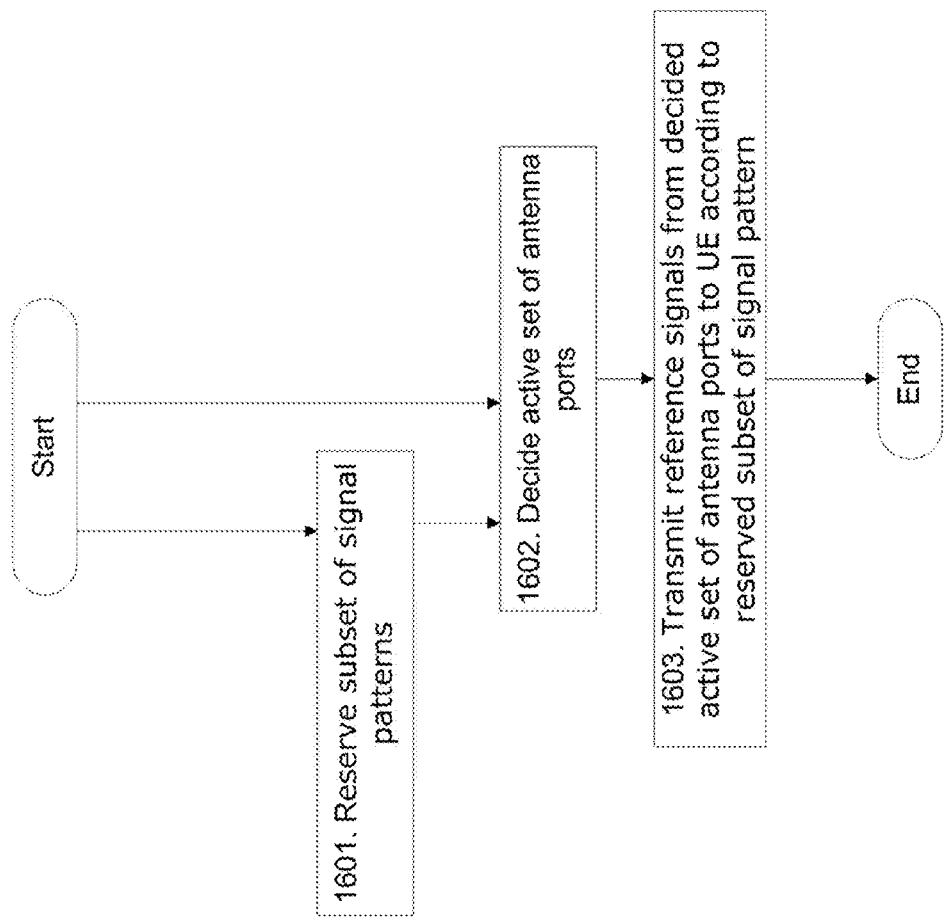
FIG. 16 is a flow chart illustrating embodiments of a method in a network node.

The method described above for enhanced cell planning adopted for heterogeneous network deployments which enables interference coordination in a communication network 500 will now be described seen from the perspective of the network node 503. The network node 503 comprises a plurality of antenna ports. Each antenna port is configured to transmit a reference signal according to a signal pattern. The transmission of the reference signal is non-dedicated, i.e. it may be received by a plurality of user equipments 505. FIG. 16 is a flowchart describing the present method in the network node 503. The method comprises the steps to be performed by the network node 503:

Step 1601

In some embodiments, the network node 503 reserves a subset of signal patterns for at least one layer of network node 503. The subset of signal patterns is reserved from a plurality of signal patterns or indications to signal patterns, and the subset of signal patterns is associated with low interference subframes.

In some embodiments, subset of signal patterns is reserved for a group of cells or a group of network nodes 503. The person skilled in the art can recognize that a set of cells is associated with a radio network node, and a set of cells comprises at least one cell.

In some embodiments, the group network nodes 503 belong to a layer.

In some embodiments, the reserved subset of signal patterns is dynamically maintained by the communication network 500.

In some embodiments, the reserved subset of signal pattern is designed accounting for the set of active antenna ports to be used by another layer in low-interference or blank sub frames. In some embodiments, the blank sub frames are almost blank sub frames.

Step 1602

The network node 503 decides an active set of antenna ports from the plurality of antenna ports based on a reserved subset of signal pattern or indications to signal patterns associated with at least one layer of network node. The subset of signal patterns is associated with low interference subframes and reserved from the plurality of signal patterns or indications to signal patterns.

In some embodiments, the deciding and active set of antenna ports is further based on low interference subframes. Low interference subframes is associated with time periods with reduced interference.

Step 1603

The network node 503 transmits reference signals from the decided active set of antenna ports to a user equipment 505 according to the reserved subset of signal pattern, enabling interference coordination in the communication network 500. The transmission of the signal reference signal is non-dedicated, i.e. it may be received by a plurality of user equipments 505.

Figure 17:
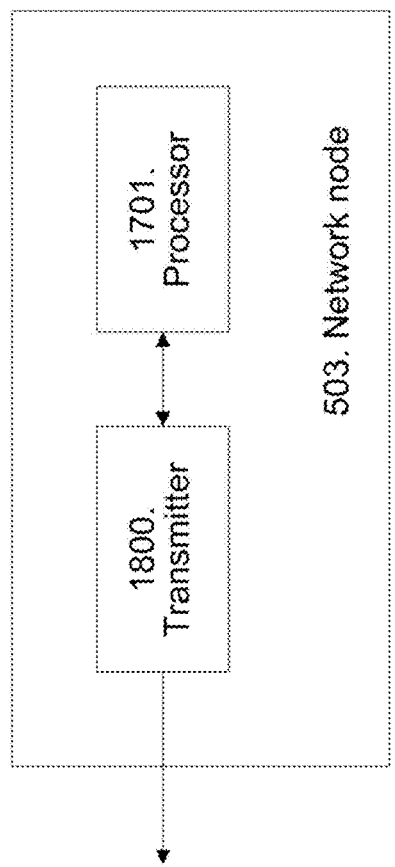
FIG. 17 is a block diagram illustrating an embodiment of a network node.

To perform the method steps shown in FIG. 16 for enabling interference coordination in a communication network 500, the network node 503 comprises a network node arrangement as shown in FIG. 17. The network node 503 comprises a plurality of antenna ports. Each antenna port is configured to transmit a reference signal according to a signal pattern. The network node 503 comprises a processor 1701 configured to decide an active set of antenna ports from the plurality of antenna ports based on a reserved subset of signal patterns associated with at least one layer of network node 503. In some embodiments, the plurality of signal patterns comprises one or more pattern identities. The subset of signal patterns associated with low interference subframes and reserved from a plurality of signal patterns or indications to signal patterns. The network node 503 further comprises a transmitter 1800 configured to transmit reference signals from the decided active set of antenna ports to a user equipment 505 according to the reserved subset of signal pattern, enabling interference coordination in the communication network 500. The transmission of the signal reference signal is non-dedicated, i.e. it may be received by a plurality of user equipments 505. In some embodiments, the deciding an active set of antenna ports is further based on blank sub frames. In some embodiments, the blank sub frames are almost blank sub frames.

In some embodiments, the processor 1701 is further configured to reserve a subset of signal patterns for at least one layer of network node 503. The subset of signal patterns is reserved from the plurality of signal patterns, and the subset of signal patterns is associated with low interference subframes.

In some embodiments, the subset of signal patterns is reserved for a group of network nodes 503. In some embodiments, the group network nodes 503 belong to a layer.

In some embodiments, the plurality of signal patterns or indications to signal patterns is pre-configured in the network node, configured based on the information received from a second network node within the communication network or configured based on the information obtained from a macro cell 501b associated with a base station 503.

In some embodiments, the reserved subset of signal patterns is dynamically maintained by the communication network 500.

In some embodiments, the reserved subset of signal pattern is designed accounting for the set of active antenna ports to be used by another layer in low-interference or almost blank sub frames.

As described above, methods and apparatus in accordance with embodiments herein implement one or more of the following aspects:
  Facilitate control of the set of active antenna ports used for RS transmissions in order to reduce the RS interference.
    Including the signaling and the interfaces that may be involved in the method.
  Assisted UE measurement processing.
    Including the signaling and the interfaces that may be involved in the method.
  Enhanced cell planning adopted for heterogeneous network deployments.

Such methods and apparatus have at least the following technical advantages:
  Reduced CRS interference in the control region, on CRS, and data channels leading to the improved system performance and in particular in heterogeneous deployments.
  Facilitating UE measurements with some of the disclosed methods by introducing the new signaling reducing the UE complexity.
  Reduced over-estimation of the radio channel quality for legacy macro UEs, which may include low-interference subframes in the interference measurements, although they will only be scheduled in subframes with potentially much higher interference.
  Enhanced cell planning aiming at the improved performance with heterogeneous deployments.

Figure 18:
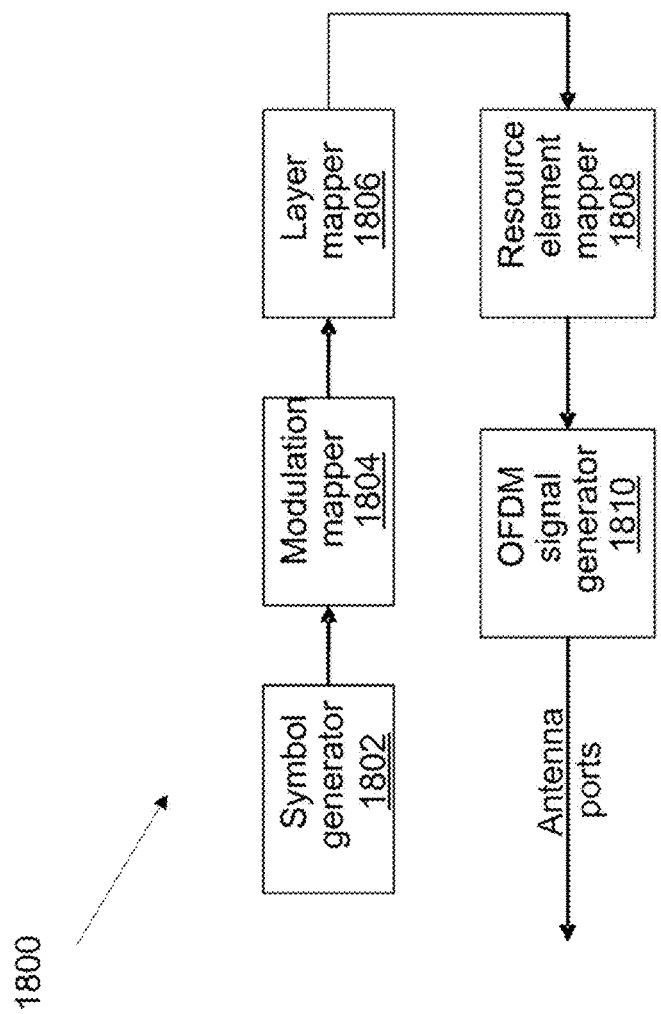
FIG. 18 is a block diagram illustrating an embodiment of a transmitter.

FIG. 18 is a block diagram of an example of a portion of transmitter 1800 for a communication system that uses the signals described above, i.e. the reference signals. The transmitter 1900 may be comprised in e.g. a base station 503, a network node 503 etc. As known for a skilled person, a communication system is equivalent to a communication network 500. Several parts of such a transmitter 1800 are known and described for example in Clauses 6.3 and 6.4 of 3GPP TS 36.211. Reference signals having symbols as described above are produced by a suitable generator 1802 and provided to a modulation mapper 1804 that produces complex-valued modulation symbols. A layer mapper 1806 maps the modulation symbols onto one or more transmission layers, which generally correspond to antenna ports as described above. An Resource Element (RE) mapper 1808 maps the modulation symbols for each antenna port onto respective Res 1808, and an OFDM signal generator 1810 produces one or more complex-valued time-domain OFDM signals for eventual transmission.

It will be appreciated that the functional blocks depicted in FIG. 18 can be combined and re-arranged in a variety of equivalent ways, and that many of the functions can be performed by one or more suitably programmed digital signal processors, such as the processor 901 illustrated in FIG. 9, processor 1501 illustrated in FIG. 15 and the processor 1701 illustrated in FIG. 17. Moreover, connections among and information provided or exchanged by the functional blocks depicted in FIG. 18 can be altered in various ways to enable a device to implement the methods described above and other methods involved in the operation of the device in a digital communication system.

FIG. 19 is a block diagram of an arrangement 1900 in a user equipment 505 that may implement the methods described above. It will be appreciated that the functional blocks depicted in FIG. 19 can be combined and re-arranged in a variety of equivalent ways, and that many of the functions can be performed by one or more suitably programmed digital signal processors, such as processor 1916 illustrated in FIG. 11 and processor 1916 illustrated in FIG. 19. Moreover, connections among and information provided or exchanged by the functional blocks depicted in FIG. 19 can be altered in various ways to enable a user equipment 505 to implement other methods involved in the operation of the user equipment 505.

As depicted in FIG. 19, a user equipment 505 receives a downlink (DL) radio signal through an antenna 1902 and typically down-converts the received radio signal to an analog baseband signal in a front end receiver (Fe RX) 1904. The baseband signal is spectrally shaped by an analog filter 1906 that has a bandwidth $BW_0$, and the shaped baseband signal generated by the filter 1906 is converted from analog to digital form by an analog-to-digital converter (ADC) 1908.

The digitized baseband signal is further spectrally shaped by a digital filter 1910 that has a bandwidth $BW_{sync}$, which corresponds to the bandwidth of synchronization signals or symbols included in the DL signal. The shaped signal generated by the filter 1910 is provided to a cell search unit 1912 that carries out one or more methods of searching for cells as specified for the particular communication system, e.g., 3G LTE. Typically, such methods involve detecting predetermined primary and/or secondary synchronization channel (P/S-SCH) signals in the received signal.

The digitized baseband signal is also provided by the ADC 1908 to a digital filter 1914 that has the bandwidth $BW_0$, and the filtered digital baseband signal is provided to a processor 1916 that implements a fast Fourier transform (FFT) or other suitable algorithm that generates a frequency-domain (spectral) representation of the baseband signal. A channel estimation unit 1918 receives signals from the processor 1916 and generates a channel estimate $H_{i,j}$ for each of several subcarriers i and cells j based on control and timing signals provided by a control unit 1920, which also provides such control and timing information to the processor 1916.

The estimator 1918 provides the channel estimates $H_i$ to a decoder 1922 and a signal power estimation unit 1924. The decoder 1922, which also receives signals from the processor 1916, is suitably configured to extract information from RRC or other messages as described above and typically generates signals subject to further processing in the UE 505 (not shown). The estimator 1924 generates received signal power measurements, e.g., estimates of reference signal received power (RSRP), received subcarrier power $S_i$, signal to interference ratio (SIR), etc. The estimator 1924 can generate estimates of RSRP, reference signal received quality (RSRQ), received signal strength indicator (RSSI), received subcarrier power $S_i$, SIR, and other relevant measurements, in various ways in response to control signals provided by the control unit 1920. Power estimates generated by the estimator 1924 are typically used in further signal processing in the UE 505.

The estimator 1924 (or the searcher 1912, for that matter) is configured to include a suitable signal correlator for handling the RS and other signals described above.

In the arrangement depicted in FIG. 19, the control unit 1920 keeps track of substantially everything needed to configure the searcher 1912, processor 1916, estimation unit 1918, and estimator 1924. For the estimation unit 1918, this includes both method and cell identity, for reference signal extraction and cell-specific scrambling of reference signals. Communication between the searcher 1912 and the control unit 1920 includes cell identity and, for example, cyclic prefix configuration.

The control unit 1920 determines which estimation method is used by the estimator 1918 and/or by the estimator 1924 for measurements on the detected cell(s) as described above. In particular, the control unit 1920, which typically can include a correlator or implement a correlator function, can receive information signaled by the eNB 503 and can control the on/off times of the Fe RX 2004 as described above.

The control unit and other blocks of the UE 505 can be implemented by one or more suitably programmed electronic processors, collections of logic gates, etc. that processes information stored in one or more memories. The stored information can include program instructions and data that enable the control unit to implement the methods described above. It will be appreciated that the control unit typically includes timers, etc. that facilitate its operations.

The methods and apparatus described can be implemented in heterogeneous deployments, but they are not limited to them, and neither are they limited to the 3GPP definition of heterogeneous network deployments. For example, the methods and apparatus can be adopted also for traditional macro deployments and/or networks operating more than one radio access technology (RAT). The methods are particularly useful for signals transmitted with a pre-defined time-frequency pattern and a limited set of available patterns, implying high collision probability and thus high interference in certain parts of the spectrum. LTE cell-specific reference signals (CRS) are an example of such signals.

It will be appreciated that the methods and devices described above can be combined and re-arranged in a variety of equivalent ways, and that the methods can be performed by one or more suitably programmed or configured digital signal processors and other known electronic circuits, e.g., discrete logic gates interconnected to perform a specialized function, or application-specific integrated circuits. Many aspects of embodiments herein are described in terms of sequences of actions that can be performed by, for example, elements of a programmable computer system. User equipments 505 embodying embodiments herein include, for example, mobile telephones, pagers, headsets, laptop computers and other mobile terminals, and the like. Moreover, the embodiments herein may additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

It will be appreciated that procedures described above are carried out repetitively as necessary, for example, to respond to the time-varying nature of communication channels between transmitters and receivers. In addition, it will be understood that the methods and apparatus described here can be implemented in various system nodes.

To facilitate understanding, many aspects of embodiments herein are described in terms of sequences of actions that can be performed by, for example, elements of a programmable computer system. It will be recognized that various actions could be performed by specialized circuits, e.g., discrete logic gates interconnected to perform a specialized function or application-specific integrated circuits, by program instructions executed by one or more processors, or by a combination of both. Wireless devices implementing embodiments herein may be included in, for example, mobile telephones, pagers, headsets, laptop computers and other mobile terminals, base stations, and the like.

Moreover, the embodiments herein can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples, a non-exhaustive list, of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the embodiments herein maybe embodied in many different forms, not all of which are described above, and all such forms are contemplated to be within the scope of embodiments herein. For each of the various aspects of the embodiments, any such form may be referred to as "logic configured to" perform a described action, or alternatively as "logic that" performs a described action.

It should be noted that the word "comprising" does not exclude the presence of other elements or steps than those listed and the words "a" or "an" preceding an element do not exclude the presence of a plurality of such elements.

What is claimed is:

1. A method in a base station for enabling interference coordination in a communication network, the base station having a plurality of antenna ports that are each configured to transmit a reference signal and are each associated with a respective cell, the method comprising:
    determining a set of cells where transmission of reference signals is to be performed from a reduced set of the plurality of antenna ports,
    determining a subset of antenna ports in at least one cell of the set of cells to enable interference coordination in the communication network; and
    transmitting the reference signal from the subset of antenna ports.

2. The method of claim 1, further comprising:
    determining a time when the reference signal is to be transmitted from a reduced set of antenna ports, wherein the time is associated with low interference subframes, and the reference signal is transmitted from the subset of the antenna ports at the determined time.

3. The method of claim 2, further comprising:
    informing a user equipment about the determined time.

4. The method of claim 3, further comprising:
    informing a user equipment about the subset of antenna ports.

5. The method of claim 2, wherein at least one of the determined time and information of the subset of antenna ports is obtained from a network node in the communication network.

6. The method of claim 1, further comprising:
    determining a time interval during which the subset of antenna ports shall apply.

7. The method of claim 6, further comprising:
    informing a user equipment about the time interval.

8. The method of claim 1, further comprising:
    re-initiating transmission of reference signals from the plurality of antenna ports.

9. The method of claim 8, further comprising:
    informing a user equipment about re-initiated reference signal transmissions.

10. The method of claim 1, further comprising:
    receiving measurements from a user equipment.

11. The method of claim 1, wherein the subset of antenna ports is configured to avoid interference from an interfering cell or reduce interference to another cell.

12. The method of claim 11, wherein the interference coordination is implemented with respect to a high interference area of a cell.

13. The method of claim 1, wherein the subset of antenna ports is pre-configured.

14. The method of claim 1, wherein transmissions from the reduced set of antenna ports apply to a part of a system bandwidth.

15. The method of claim 1, wherein transmissions from the reduced set of antenna ports in a cell are periodic or invoked by an event.

16. A base station for enabling interference coordination in a communication network, the base station having a plurality of antenna ports that are each configured to transmit a reference signal and are each associated with a respective cell, the base station comprising:
    a processor configured to
        determine a set of cells where transmission of reference signals is to be performed from a reduced set of the plurality of antenna ports, and
        determine a subset of antenna ports in at least one cell of the set of cells to enable interference coordination in the communication network; and
    a transmitter configured to transmit the reference signals from the subset of antenna ports.

17. A method in a network node for enabling interference coordination in a communication network, the network node being associated with a cell, the method comprising:
    acquiring information about a set of interfering cells among a plurality of cells; and
    transmitting the information about the set of interfering cells to a user equipment to enable interference coordination in the communication network.

18. The method of claim 17, wherein the information about the set of interfering cells comprises assistance data.

19. The method of claim 18, wherein the assistance data comprises at least one of a set of physical layer cell identities, a transmit bandwidth of an interfering cell, channel-related information, and a number of antenna ports.

20. The method of claim 17, wherein transmitting the information about the set of interfering cells is triggered upon detecting predetermined interference conditions for user equipment in the communication network.

21. The method according to claim 17, wherein the network node is associated with an interfering macro cell.

22. A network node for enabling interference coordination in a communication network, the network node being associated with a cell, the network node comprising:
    a processor configured to acquire information about a set of interfering cells among a plurality of cells; and
    one or more antennas configured to transmit information about the set of interfering cells to a user equipment to enable interference coordination in the communication network, wherein the information transmitted is based on the information acquired.

23. The network node of claim 22, wherein the one or more antennas are further configured to transmit the information about the set of interfering cells when predetermined interference conditions for the user equipment are detected in the communication network.

24. A method in a network node for enabling interference coordination in a communication network, wherein the network node includes a plurality of antenna ports that are each configured to transmit a reference signal according to a signal pattern, the method comprising:
- deciding an active set of antenna ports from the plurality of antenna ports based on a reserved subset of signal patterns associated with at least one layer of network nodes, the reserved subset of signal patterns being associated with low interference and reserved from a plurality of signal patterns or indications to signal patterns; and
- transmitting reference signals from the active set of antenna ports according to the reserved subset of signal patterns, thereby enabling interference coordination in the communication network.

25. The method of claim 24, further comprising:
- reserving a subset of signal patterns for at least one layer of network nodes, wherein the subset of signal patterns is reserved from the plurality of signal patterns or indications to signal patterns, and the subset of signal patterns is associated with low interference.

26. The method of claim 25, wherein the subset of signal patterns is reserved for a group of network nodes.

27. The method of claim 26, wherein the group network nodes belongs to a layer.

28. The method of claim 24, wherein the plurality of signal patterns or indications to signal patterns is pre-configured in the network node, obtained from a second network node, or obtained from a macro cell.

29. The method of claim 24, wherein the set of active antenna ports is decided based on low-interference subframes.

30. The method of claim 24, wherein the reserved subset of signal patterns is dynamically maintained by the communication network.

31. The method of claim 24, wherein the reserved subset of signal patterns is based on the set of active antenna ports to be used by another layer in low-interference subframes.

32. A network node for enabling interference coordination in a communication network, the network node having a plurality of antenna ports that are each configured to transmit a reference signal according to a signal pattern, the network node comprising:
- a processor configured to decide an active set of antenna ports from the plurality of antenna ports based on a reserved subset of signal patterns associated with at least one layer of network node, wherein the subset of signal patterns is associated with low interference and is reserved from a plurality of signal patterns or indications to signal patterns; and
- a transmitter configured to transmit reference signals from the active set of antenna ports according to the reserved subset of signal patterns, thereby enabling interference coordination in the communication network.

33. The network node of claim 32, wherein the plurality of signal patterns or indications to signal patterns is pre-configured in the network node or configured based on information received from a second network node in the communication network or configured based on information obtained from a macro cell associated with a base station.

* * * * *